(12) United States Patent
Tamaki et al.

(10) Patent No.: US 10,570,470 B2
(45) Date of Patent: Feb. 25, 2020

(54) STEEL SHEET FOR HOT STAMPING, METHOD OF MANUFACTURING THE SAME, AND HOT STAMPED STEEL SHEET MEMBER

(71) Applicant: NIPPON STEEL & SUMITOMO METAL CORPORATION, Tokyo (JP)

(72) Inventors: Akari Tamaki, Tokyo (JP); Kazuo Hikida, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 944 days.

(21) Appl. No.: 14/417,963

(22) PCT Filed: Aug. 15, 2013

(86) PCT No.: PCT/JP2013/071971
§ 371 (c)(1),
(2) Date: Jan. 28, 2015

(87) PCT Pub. No.: WO2014/027682
PCT Pub. Date: Feb. 20, 2014

(65) Prior Publication Data
US 2015/0284819 A1    Oct. 8, 2015

(30) Foreign Application Priority Data

Aug. 15, 2012  (JP) ................. 2012-180186

(51) Int. Cl.
| | |
|---|---|
| *C21D 8/02* | (2006.01) |
| *C21D 6/00* | (2006.01) |
| *C22C 38/58* | (2006.01) |
| *C22C 38/54* | (2006.01) |
| *C22C 38/50* | (2006.01) |
| *C22C 38/38* | (2006.01) |

(Continued)

(52) U.S. Cl.
CPC ............ *C21D 8/0263* (2013.01); *B32B 15/01* (2013.01); *C21D 1/18* (2013.01); *C21D 1/673* (2013.01); *C21D 6/001* (2013.01); *C21D 6/002* (2013.01); *C21D 6/004* (2013.01); *C21D 6/005* (2013.01); *C21D 6/008* (2013.01); *C21D 8/0205* (2013.01); *C21D 8/0226* (2013.01); *C21D 8/0236* (2013.01); *C21D 8/0247* (2013.01); *C21D 9/46* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/18* (2013.01); *C22C 38/22* (2013.01); *C22C 38/24* (2013.01); *C22C 38/26* (2013.01); *C22C 38/28* (2013.01); *C22C 38/32* (2013.01); *C22C 38/38* (2013.01); *C22C 38/50* (2013.01); *C22C 38/54* (2013.01); *C22C 38/58* (2013.01); *C23C 2/02* (2013.01); *C23C 2/06* (2013.01); *C21D 2211/002* (2013.01); *C21D 2211/005* (2013.01); *C21D 2211/008* (2013.01)

(58) Field of Classification Search
CPC ........ C21D 2211/002; C21D 2211/005; C21D 2211/008; C21D 2211/009; C21D 8/0263; C21D 8/0226; C21D 8/0236; C21D 9/46; C21D 6/001; C21D 6/002; C21D 6/004; C21D 6/005; C21D 6/008; C22C 38/58; C22C 38/54; C22C 38/50; C22C 38/38; C22C 38/32; C22C 38/28; C22C 38/26; C22C 38/24; C22C 38/22; C22C 38/16; C22C 38/14; C22C 38/12; C22C 38/08; C22C 38/06; C22C 38/04; C22C 38/02; C22C 38/005; C22C 38/002; C22C 38/001; C23C 2/02; C23C 2/06
See application file for complete search history.

(56) References Cited

U.S. PATENT DOCUMENTS 7,922,834 B2  4/2011  Tanaka et al.
8,157,928 B2  4/2012  Tanaka et al.
(Continued)

FOREIGN PATENT DOCUMENTS

CA    2780082 A1    10/2011
CA    2832901 A1    11/2012
(Continued)

OTHER PUBLICATIONS

Korean Office Action dated Dec. 21, 2015, issued in corresponding Korean Patent Application No. 10-2015-7003325.
(Continued)

Primary Examiner — Colleen P Dunn
Assistant Examiner — Anthony M Liang
(74) Attorney, Agent, or Firm — Birch, Stewart, Kolasch & Birch, LLP

(57) ABSTRACT

A steel sheet for hot stamping includes a predetermined chemical composition containing: C: 0.08% or more and less than 0.20%; Si: 0.003% to 0.2%; Mn: 1.6% to 3.5%, and others, and further includes a steel structure expressed by, in an area ratio: bainite: 1% to 95%; ferrite: 5% to 94%; and balance: one or more selected from the group consisting of pearlite, martensite and retained austenite. When an Mn content is represented by [Mn], a C content is represented by [C], an expression of "[Mn]+6.67×[C]−2.73≥0" is satisfied.

21 Claims, No Drawings

(51) Int. Cl.
*C22C 38/28* (2006.01)
*C22C 38/26* (2006.01)
*C22C 38/24* (2006.01)
*C22C 38/22* (2006.01)
*C21D 9/46* (2006.01)
*C22C 38/06* (2006.01)
*C22C 38/00* (2006.01)
*C22C 38/02* (2006.01)
*C22C 38/04* (2006.01)
*C22C 38/14* (2006.01)
*C21D 1/18* (2006.01)
*C21D 1/673* (2006.01)
*B32B 15/01* (2006.01)
*C22C 38/18* (2006.01)
*C22C 38/08* (2006.01)
*C22C 38/12* (2006.01)
*C22C 38/16* (2006.01)
*C22C 38/32* (2006.01)
*C23C 2/02* (2006.01)
*C23C 2/06* (2006.01)

(56) References Cited

U.S. PATENT DOCUMENTS

| | | | | |
|---|---|---|---|---|
| 2003/0084965 | A1* | 5/2003 | Nishi | C22C 38/002 148/320 |
| 2006/0081312 | A1* | 4/2006 | Yokoi | C22C 38/001 148/533 |
| 2010/0218857 | A1 | 9/2010 | Nakagaito et al. | |
| 2013/0213534 | A1 | 8/2013 | Hikita et al. | |
| 2014/0335374 | A1 | 11/2014 | Nakagaito et al. | |

FOREIGN PATENT DOCUMENTS

| | | |
|---|---|---|
| CA | 2862257 A1 | 7/2013 |
| CA | 2862810 A1 | 7/2013 |
| CA | 2863218 A1 | 7/2013 |
| CA | 2879069 A1 | 2/2014 |
| CA | 2879540 A1 | 2/2014 |
| CA | 2791018 C | 10/2015 |
| CN | 101218362 B | 5/2010 |
| CN | 101821419 A | 9/2010 |
| EP | 1865085 A1 | 12/2007 |
| EP | 2098600 A1 | 9/2009 |
| EP | 2460903 A1 | 6/2012 |
| EP | 2527482 A1 | 11/2012 |
| EP | 2530179 A1 | 12/2012 |
| EP | 2 631 306 A1 | 8/2013 |
| JP | 2001-226741 A | 8/2001 |
| JP | 2002-102980 A | 4/2002 |
| JP | 2003-073742 A | 3/2003 |
| JP | 2004250744 A * | 9/2004 |
| JP | 2004-323944 A | 11/2004 |
| JP | 2004-332104 A | 11/2004 |
| JP | 2005-126733 A | 5/2005 |
| JP | 2006-70346 A | 3/2006 |
| JP | 2006-212663 A | 8/2006 |
| JP | 3879459 B2 | 2/2007 |
| JP | 2007-211276 A | 8/2007 |
| JP | 2010-65292 A | 3/2010 |
| JP | 2010-174301 A | 8/2010 |
| JP | 2011-195958 A | 10/2011 |
| JP | 2011-236483 A | 11/2011 |
| KR | 1020070041645 A | 4/2007 |
| WO | WO 2011/090180 A1 | 7/2011 |
| WO | WO 2011/093319 A1 | 8/2011 |
| WO | WO 2012/053636 A1 | 4/2012 |

OTHER PUBLICATIONS

Extended European Search Report, dated Oct. 28, 2016, for European Application No. 13829271.9.
Taiwanese Office Action and Search Report, dated Aug. 20, 2014, issued in Taiwanese Application No. 102129294, with partial English translation thereof.
International Search Report, dated Nov. 5, 2013, issued in PCT/JP2013/071971.
Written Opinion of the International Searching Authority, dated Nov. 5, 2013, issued in PCT/JP2013/071971.
Chinese Office Action and Search Report, dated Dec. 24, 2015, for corresponding Chinese Application No. 201380043065.8.
English translation of International Preliminary Examination Report dated Feb. 26, 2015, issued in PCT/JP2013/071971 (Forms PCT/IB/338, PCT/IB/373, PCT/ISA/237).
European Office Action for Application No. 13829271.9, dated May 18, 2018.
Rod, Olivier et al., "Opportunities and dangers of using residual elements in steels: a literature survey", Jernkontorets Forskning, 2006, XP 55468670A.
Indian Examination Report issued in corresponding Indian Application No. 705/DELNP/2015, dated Feb. 25, 2019, together with an English translation.
Canadian Office Action, dated Aug. 1, 2016, for Canadian Application No. 2,880,946.
Partial Supplementary European Search Report, dated May 30, 2016, for European Application No. 13829271.9.

* cited by examiner

STEEL SHEET FOR HOT STAMPING, METHOD OF MANUFACTURING THE SAME, AND HOT STAMPED STEEL SHEET MEMBER

TECHNICAL FIELD

The present invention relates to a steel sheet for hot stamping, a method of manufacturing the same, and a hot stamped steel sheet member suitable for manufacturing a mechanical structure component and so on.

BACKGROUND ART

Efforts to reduce a weight of steel used for a vehicle body by high-strengthening of the steel have been continued for reduction in weight of a vehicle. High-strengthening of steel contributes to improvement in a collision resistant property of a vehicle. As for a thin steel sheet widely used for a vehicle, press formability generally deteriorates and it becomes more difficult to manufacture a component having a complicated shape, in accordance with increase in strength. For example, a portion with high degree of processing fractures and dimensional accuracy deteriorates due to larger springback in accordance with lowering of ductility. Accordingly, it is not easy to manufacture components by press-forming of a high-strength steel sheet, in particular, a steel sheet having tensile-strength of 780 MPa or more. It is easy to process a high-strength steel sheet not by press-forming but by roll-forming, but an application target is limited to a component having a uniform cross section in a longitudinal direction.

A method called as hot stamping aimed for obtaining high formability for a high-strength steel sheet is described in Patent Literature 1. According to the hot stamping, it is possible to form a high-strength steel sheet with high accuracy, and obtain a high-strength hot stamped steel sheet member.

A material whose strength after quenching is 1500 MPa class is described in Patent Literatures 2 and 3. A steel sheet for hot stamping aimed for improvement in ductility while obtaining high-strength is described in Patent Literature 4. A steel sheet aimed for improvement in hardenability is described in Patent Literatures 5 and 6. However, there are problems in these arts in which it is necessary to start the quenching at high temperature, it is difficult to improve toughness and local deformability, and others.

CITATION LIST

Patent Literature

Patent Literature 1: Japanese Laid-open Patent Publication No. 2002-102980
Patent Literature 2: Japanese Laid-open Patent Publication No. 2011-236483
Patent Literature 3: Japanese Laid-open Patent Publication No. 2004-323944
Patent Literature 4: Japanese Laid-open Patent Publication No. 2010-65292
Patent Literature 5: Japanese Laid-open Patent Publication No. 2011-195958
Patent Literature 6: Japanese Patent Publication No. 3879459

SUMMARY OF INVENTION

Technical Problem

An object of the present invention is to provide a steel sheet for hot stamping, a method of manufacturing the same, and a hot stamped steel sheet member capable of obtaining good toughness and local deformability even when quenching is started at a relatively low temperature.

Solution to Problem

The present inventors studied hard from a point of view in which it is important to enable to generate martensite with high area ratio by quenching to obtain fine toughness and local deformability after the quenching, and a special chemical composition is important to enable to start quenching at a relatively low temperature. As a result, it is found that good toughness and local deformability can be obtained even if quenching is started at a relatively low temperature owing to a combination of a chemical composition and a steel structure within a certain range. The present inventors have come to think of various embodiments of invention described below.

(1)
A steel sheet for hot stamping, including
a chemical composition expressed by, in mass %:
C: 0.08% or more and less than 0.20%;
Si: 0.003% to 0.2%;
Mn: 1.6% to 3.5%;
sol. Al: 0.0002% to 2.0%;
B: 0.0003% to 0.01%;
P: 0.1% or less;
S: 0.004% or less;
N: 0.01% or less;
Ti: 0% to $0.04+48/14\times[N]$ % when an N content is expressed by [N];
Cr: 0% to 1.00%;
Bi: 0% to 0.5%;
Ca: 0% to 0.05%;
Mg: 0% to 0.05%;
REM: 0% to 0.05%;
Mo: 0% to 1%;
Cu: 0% to 1%;
Ni: 0% to 1%;
W: 0% to 1%;
Nb: 0% to 1%;
V: 0% to 1%;
balance: Fe and impurities,
wherein:
an expression (1) is satisfied when an Mn content is represented by [Mn] and a C content is represented by [C], $$\text{where } [Mn]+6.67\times[C]-2.73\geq 0 \qquad (1); \text{ and}$$

the steel sheet includes a steel structure expressed by, in an area ratio:
bainite: 1% to 95%;
ferrite: 5% to 94%; and
balance: one or more selected from the group consisting of pearlite, martensite and retained austenite.
(2)
The steel sheet for hot stamping according to (1), wherein an area ratio of bainite is 20% to 95%, and an area ratio of ferrite is 5% to 80%.

(3)
The steel sheet for hot stamping according to (1), wherein
an area ratio of bainite is 1% or more and less than 20%, and
an area ratio of ferrite is 40% to 94%.
(4)
The steel sheet for hot stamping according to any one of (1) to (3), wherein the chemical content contains:
Ti: 48/14×[N] % to 0.04+48/14×[N] %.
(5)
The steel sheet for hot stamping according to any one of (1) to (4), wherein
a Cr content is 0.01% to 1.00%, and
when the Mn content is represented by [Mn] and the Cr content is represented by [Cr], an expression (2) is satisfied, $$1.6 \leq [Mn]+[Cr] \leq 3.5 \quad (2).$$

(6)
The steel sheet for hot stamping according to any one of (1) to (5), wherein the chemical content contains:
Bi: 0.0001% to 0.5%.
(7)
The steel sheet for hot stamping according to any one of (1) to (6), wherein the chemical composition contains one or more selected from the group consisting of:
Ca: 0.0005% to 0.05%;
Mg: 0.0005% to 0.05%; and
REM: 0.0005% to 0.05%.
(8)
The steel sheet for hot stamping according to any one of (1) to (7), wherein the chemical composition contains one or more selected from the group consisting of:
Mo: 0.03% to 1%;
Cu: 0.01% to 1%;
Ni: 0.01% to 1%; and
W: 0.01% to 1%.
(9)
The steel sheet for hot stamping according to any one of (1) to (8), wherein the chemical composition contains one or two selected from the group consisting of:
Nb: 0.005% to 1%; and
V: 0.005% to 1%.
(10)
A method of manufacturing a steel sheet for hot stamping, including:
hot-rolling a steel ingot or a steel billet;
acid-pickling a steel sheet obtained by the hot-rolling;
cold-rolling a steel sheet obtained by the acid pickling; and
performing a heat treatment of a steel sheet obtained by the cold-rolling,
wherein:
the steel ingot or the steel billet includes a chemical composition expressed by, in mass %:
C: 0.08% or more and less than 0.20%;
Si: 0.003% to 0.2%;
Mn: 1.6% to 3.5%;
sol. Al: 0.0002% to 2.0%;
B: 0.0003% to 0.01%;
P: 0.1% or less;
S: 0.004% or less;
N: 0.01% or less;
Ti: 0% to 0.04+48/14×[N] % when an N content is represented by [N];
Cr: 0% to 1.00%;
Bi: 0% to 0.5%;
Ca: 0% to 0.05%;
Mg: 0% to 0.05%;
REM: 0% to 0.05%;
Mo: 0% to 1%;
Cu: 0% to 1%;
Ni: 0% to 1%;
W: 0% to 1%;
Nb: 0% to 1%;
V: 0% to 1%;
balance: Fe and impurities;
an expression (1) is satisfied when an Mn content is represented by [Mn] and a C content is represented by [C], $$\text{where } [Mn]+6.67\times[C]-2.73 \geq 0 \quad (1);$$

the hot-rolling includes:
starting a rolling at a temperature of 1050° C. or more; and
thereafter coiling at a temperature zone of 400° C. to 700° C.; and
the performing the heat treatment includes:
heating to a temperature zone of 700° C. to 840° C.;
thereafter cooling to a temperature of 500° C. or less at an average cooling rate of 5° C./sec to 100° C./sec; and
thereafter retaining at a temperature zone of 300° C. to 500° C. for 5 seconds to 600 seconds.
(11)
A method of manufacturing a steel sheet for hot stamping, including:
hot-rolling a steel ingot or a steel billet;
acid-pickling a steel sheet obtained by the hot-rolling;
cold-rolling a steel sheet obtained by the acid pickling;
performing a heat treatment of a steel sheet obtained by the cold-rolling, and
plating a steel sheet obtained by the heat treatment,
wherein:
the steel ingot or the steel billet includes a chemical composition expressed by, in mass %:
C: 0.08% or more and less than 0.20%;
Si: 0.003% to 0.2%;
Mn: 1.6% to 3.5%;
sol. Al: 0.0002% to 2.0%;
B: 0.0003% to 0.01%;
P: 0.1% or less;
S: 0.004% or less;
N: 0.01% or less;
Ti: 0% to 0.04+48/14×[N] % when an N content is represented by [N];
Cr: 0% to 1.00%;
Bi: 0% to 0.5%;
Ca: 0% to 0.05%;
Mg: 0% to 0.05%;
REM: 0% to 0.05%;
Mo: 0% to 1%;
Cu: 0% to 1%;
Ni: 0% to 1%;
W: 0% to 1%;
Nb: 0% to 1%;
V: 0% to 10;
balance: Fe and impurities;
an expression (1) is satisfied when an Mn content is represented by [Mn] and a C content is represented by [C], $$\text{where } [Mn]+6.67\times[C]-2.73 \geq 0 \quad (1);$$

the hot-rolling includes:
starting a rolling at a temperature of 1050° C. or more; and
thereafter coiling at a temperature zone of 400° C. to 700° C.;

the performing the heat treatment includes:
heating to a temperature zone of 700° C. to 840° C.;
thereafter cooling to a temperature of 580° C. or less at an average cooling rate of 3° C./sec to 20° C./sec; and
thereafter retaining at a temperature zone of 500° C. to 570° C. for 5 seconds to 600 seconds; and
the plating includes:
performing a hot-dip galvanizing treatment; and
thereafter performing an alloying treatment at a temperature zone of 500° C. to 650° C.

(12)

The method of manufacturing the steel sheet for hot stamping according to (10) or (11),
wherein the chemical composition contains:
Ti: $48/14 \times [N]$ % to $0.04+48/14 \times [N]$ %.

(13)

The method of manufacturing the steel sheet for hot stamping according to any one of (10) to (12),
wherein a Cr content is 0.01% to 1.00%, and when the Mn content is represented by [Mn] and the Cr content is represented by [Cr], an expression (2) is satisfied, $$1.6 \leq [Mn]+[Cr] \leq 3.5 \qquad (2).$$

(14)

The method of manufacturing the steel sheet for hot stamping according to any one of (10) to (13),
wherein the chemical composition contains:
Bi: 0.0001% to 0.5%.

(15)

The method of manufacturing the steel sheet for hot stamping according to any one of (10) to (14),
wherein the chemical composition contains one kind or two or more kinds selected from a group made up of:
Ca: 0.0005% to 0.05%;
Mg: 0.0005% to 0.05%; and
REM: 0.0005% to 0.05%.

(16)

The method of manufacturing the steel sheet for hot stamping according to any one of (10) to (15),
wherein the chemical composition contains one kind or two or more kinds selected from a group made up of:
Mo: 0% to 1%;
Cu: 0% to 1%;
Ni: 0% to 1%; and
W: 0% to 1%.

(17)

The method of manufacturing the steel sheet for hot stamping according to any one of (10) to (16),
wherein the chemical composition contains one kind or two kinds selected from a group made up of:
Nb: 0% to 1%; and
V: 0% to 1%.

(18)

A hot stamped steel sheet member, having a chemical composition represented by, in mass %:
C: 0.08% or more and less than 0.20%;
Si: 0.003% to 0.2%;
Mn: 1.6% to 3.5%;
sol. Al: 0.0002% to 2.0%;
B: 0.0003% to 0.01%;
P: 0.1% or less;
S: 0.004% or less;
N: 0.01% or less;
Ti: 0% to $0.04+48/14 \times [N]$ % when an N content is represented by [N];
Cr: 0% to 1.00%;
Bi: 0% to 0.5%;
Ca: 0% to 0.05%;
Mg: 0% to 0.05%;
REM: 0% to 0.05%;
Mo: 0% to 1%;
Cu: 0% to 1%;
Ni: 0% to 1%;
W: 0% to 1%;
Nb: 0% to 1%;
V: 0% to 1%;
balance: Fe and impurities,
wherein an expression (1) is satisfied when an Mn content is represented by [Mn], a C content is represented by [C], $$\text{where } [Mn]+6.67 \times [C]-2.73 \geq 0 \qquad (1)$$

and having a steel structure in which an area ratio of martensite is 90% or more, and a tensile strength is 1600 MPa or less.

(19)

The hot stamped steel sheet member according to (18),
wherein the chemical composition contains:
Ti: $48/14 \times [N]$ % to $0.04+48/14 \times [N]$ %.

(20)

The hot stamped steel sheet member according to (18) or (19),
wherein a Cr content is 0.01% to 1.00%, and when the Mn content is represented by [Mn] and the Cr content is represented by [Cr], an expression (2) is satisfied, $$1.6 \leq [Mn]+[Cr] \leq 3.5 \qquad (2).$$

(21)

The hot stamped steel sheet member according to any one of (18) to (20),
wherein the chemical composition contains:
Bi: 0.0001% to 0.5%.

(22)

The hot stamped steel sheet member according to any one of (18) to (21),
wherein the chemical composition contains one kind or two or more kinds selected from a group made up of:
Ca: 0.0005% to 0.05%;
Mg: 0.0005% to 0.05%; and
REM: 0.0005% to 0.05%.

(23)

The hot stamped steel sheet member according to any one of (18) to (22),
wherein the chemical composition contains one kind or two or more kinds selected from a group made up of:
Mo: 0% to 1%;
Cu: 0% to 10;
Ni: 0% to 1%; and
W: 0% to 1%.

(24)

The hot stamped steel sheet member according to any one of (18) to (23),
wherein the chemical composition contains one kind or two kinds selected from a group made up of:
Nb: 0% to 1%; and
V: 0% to 1%.

Advantageous Effects of Invention

According to the present invention, it is possible to obtain good toughness and local deformability even if quenching is started at a relatively low temperature.

DESCRIPTION OF EMBODIMENTS

Hereinafter, embodiments of the present invention are described. The embodiments of the present invention relate to a steel sheet for hot stamping used for manufacturing a hot stamped steel sheet member by hot stamping. In hot stamping, a steel sheet for hot stamping is generally heated to be formed and then quenched. According to the steel sheet for hot stamping of the present embodiment, it is possible to obtain an enough amount of martensite even if the quenching after the heating is started at a relatively low temperature with, for example, a combination of a chemical composition and a steel structure described below.

First, the chemical composition of the steel sheet for hot stamping according to the present embodiment is described. In the following description, "%" being a unit of a content of each element contained in the steel sheet for hot stamping means "mass %" unless otherwise specified.

The chemical composition of the steel sheet for hot stamping according to the present embodiment is expressed by, in mass %, C: 0.08% or more and less than 0.20%; Si: 0.003% to 0.2%; Mn: 1.6% to 3.5%; sol. Al: 0.0002% to 2.0%; B: 0.0003% to 0.01%; P: 0.1% or less; S: 0.004% or less; N: 0.01% or less; Ti: 0% to 0.04+48/14×[N] % when an N content is represented by [N]; Cr: 0% to 1.00%; Bi: 0% to 0.5%; Ca: 0% to 0.05%; Mg: 0% to 0.05%; REM: 0% to 0.05%; Mo: 0% to 1%; Cu: 0% to 1%; Ni: 0% to 1%; W: 0% to 1%; Nb: 0% to 1%; V: 0% to 1%; balance: Fe and impurities. Besides, an expression (1) is satisfied when an Mn content is represented by [Mn], a C content is represented by [C]. As the impurities, ones contained in raw materials such as ore and scrap, and ones contained in a manufacturing process are exemplified.

$$[Mn]+6.67\times[C]-2.73\geq 0 \tag{1}$$

(C: 0.08% or more and less than 0.20%)

C is a very important element which increases hardenability and mainly affects strength after quenching. C is also a very important element which is effective for controlling local deformability (local ductility) and toughness (impact absorption characteristic) after hot stamping. When a C content is less than 0.08%, the strength after quenching may be insufficient, or enough hardenability cannot be obtained. Accordingly, the C content is 0.08% or more. When the C content is 0.20% or more, the strength after quenching is excessively high, and enough local deformability and toughness cannot be obtained. Therefore, the C content is less than 0.20%. The C content is preferably 0.18% or less, and more preferably 0.16% or less.

(Si: 0.003% to 0.2%)

Si is a very effective element to improve the hardenability and to stably secure the strength after quenching. Si has a function to suppress generation of scale in a high-temperature heating in the hot stamping. When an Si content is less than 0.003%, it is difficult to obtain the above-stated functions. Accordingly, the Si content is 0.003% or more. To obtain the above-stated functions more certainly, the Si content is preferably 0.01% or more. When the Si content exceeds 0.2%, a temperature in which an austenite transformation occurs is remarkably high. Accordingly, a cost required for the heating of the hot stamping may increase, or the quenching is insufficient caused by heating shortage. Besides, when a hot-dip plating treatment is performed, wettability is lowered. Therefore, the Si content is 0.2% or less.

(Mn: 1.6% to 3.5%)

Mn is a very effective element to improve the hardenability and to stably secure the strength after quenching. When an Mn content is less than 1.6%, it is difficult to obtain the above-stated functions. Accordingly, the Mn content is 1.6% or more. To obtain the above-stated functions more certainly, the Mn content is preferably 2.0% or more. When the Mn content exceeds 3.5%, effects by the above-stated functions are saturated, and the toughness after quenching is lowered. Accordingly, the Mn content is 3.5% or less.

Besides, when the Mn content is represented by [Mn], and the C content is represented by [C], the expression (1) is satisfied.

$$[Mn]+6.67\times[C]-2.73\geq 0 \tag{1}$$

When the expression (1) is not satisfied, the hardenability is insufficient, and desired mechanical properties cannot be obtained after the hot stamping.

(sol. Al (acid-soluble Al): 0.0002% to 2.0%)

Al is an element having a function to enable soundness of steel by deoxidizing molten steel. When an sol. Al content is less than 0.0002%, it is difficult to obtain the above-stated function. Accordingly, the sol. Al content is 0.0002% or more. Al is also a very effective element to improve the hardenability and to stably secure the strength after quenching. However, when the sol. Al content exceeds 2.0%, effects by the above-stated functions are saturated, and a cost unnecessarily increases. Accordingly, the sol. Al content is 2.0% or less.

(B: 0.0003% to 0.01%)

B is a very effective element to improve the hardenability and to stably secure the strength after quenching. When a B content is less than 0.0003%, it is difficult to obtain the above-stated functions. Accordingly, the B content is 0.0003% or more. When the B content exceeds 0.01%, effects by the above-stated functions are saturated, and the toughness after quenching is lowered. Accordingly, the B content is 0.01% or less.

(P: 0.1% or Less)

P is not an essential element, and may be contained as an impurity in steel, for example. From a point of view of toughness, the less a P content is, the better it is. In particular, when the P content exceeds 0.1%, the lowering of the toughness is remarkable. Accordingly, the P content is 0.1% or less. To secure better toughness, the P content is preferably 0.05% or less, and more preferably 0.03% or less. P is able to contribute to improve the hardenability and to stably secure the strength after quenching. P may be intentionally contained to obtain the functions. It costs a lot to reduce the P content, and the cost remarkably increases to reduce the P content to less than 0.0002%. Accordingly, the P content may be 0.0002% or more.

(S: 0.004% or Less)

S is not an essential element, and may be contained as an impurity in steel, for example. From a point of view of toughness, the less an S content is, the better it is. In particular, when the S content exceeds 0.004%, the lowering of the toughness is remarkable. Accordingly, the S content is 0.004% or less. It costs a lot to reduce the S content, and the cost remarkably increases to reduce the S content to less than 0.0002%. Accordingly, the S content may be 0.0002% or more.

(N: 0.01% or Less)

N is not an essential element, and may be contained as an impurity in steel, for example. From a point of view of toughness, the less an N content is, the better it is. In particular, when the N content exceeds 0.01%, the local deformability and the toughness are remarkably lowered in accordance with formation of coarse nitrides. Accordingly, the N content is 0.01% or less. It costs a lot to reduce the N content, and the cost remarkably increases to reduce the N content to less than 0.0002%. Accordingly, the N content may be 0.0002% or more, or to be 0.0008% or more to further reduce the cost.

Ti, Cr, Bi, Ca, Mg, REM, Mo, Cu, Ni, W, Nb, and V are not essential elements, and are arbitrary elements, which may be appropriately contained in the steel sheet for hot stamping up to a predetermined amount as a limit.

(Ti: 0% to 0.04+48/14×[N] % when the N content is represented by [N] %)

Ti suppresses recrystallization of austenite, suppresses a grain growth by forming further fine carbides to refine austenite grains when the steel sheet for hot stamping is heated to the $Ac_3$ point or more in the hot stamping. As a result, the toughness of the hot stamped steel sheet member largely improves. Accordingly, Ti may be contained. To surely obtain the effect, a Ti content is preferably 48/14×[N] % or more. However, when the Ti content exceeds 48/14×[N]+0.04, the effect by the above-stated function is saturated, and the cost unnecessarily increases. Accordingly, the Ti content is 0.04+48/14×[N] % or less. Namely, it is preferable that "Ti: 48/14×[N] % to 0.04+48/14×[N] %" is satisfied.

(Cr: 0% to 1.00%)

Cr is a very effective element to improve the hardenability and to stably secure the strength after quenching as same as Mn. Accordingly, Cr may be contained. To surely obtain the effect, a Cr content is preferably 0.01% or more, and more preferably 0.1% or more. However, when the Cr content exceeds 1.00%, the above-stated effects are saturated, and the cost unnecessarily increases. Accordingly, the Cr content is 1.00% or less. Namely, it is preferable that "Cr: 0.01% to 1.00%" is satisfied. Besides, when a sum of the Mn content and the Cr content exceeds 3.5%, the effects by the above-stated functions are saturated, and the toughness after quenching is lowered. Accordingly, the sum of the Mn content and the Cr content is 3.5% or less. Namely, when the Mn content is represented by [Mn], the Cr content is represented by [Cr], it is preferable that an expression (2) is satisfied. The sum of the Mn content and the Cr content is preferably 2.8% or less.

$$1.6 \leq [Mn]+[Cr] \leq 3.5 \quad (2)$$

(Bi: 0% to 0.5%)

Bi is an element which has a function to become a solidification nucleus in a solidification process of molten steel and make a secondary arm spacing of dendrite small so as to suppress segregation of Mn and others within the secondary arm spacing of dendrite. In particular, in the present embodiment, Mn of 1.6% or more is contained, and therefore, Bi is effective to suppress the lowering of the toughness resulting from the segregation of Mn. Accordingly, Bi may be contained. To surely obtain the effect, a Bi content is preferably 0.0001% or more. However, when the Bi content exceeds 0.5%, the effect by the above-stated function is saturated, and the cost unnecessarily increases. Accordingly, the Bi content is 0.5% or less. Namely, it is preferable that "Bi: 0.0001% to 0.5%" is satisfied. From a point of view of suppression of the segregation of Mn and others, the Bi content is more preferably 0.0002% or more, and further preferably 0.0005% or more.

(Ca: 0% to 0.05%, Mg: 0% to 0.05%, REM: 0% to 0.05%)

Each of Ca, Mg, and REM is an element which has a function to refine inclusions in the steel and prevent cracks resulting from the inclusions in the hot stamping. Accordingly, one or more selected from the group consisting of these elements may be contained. To surely obtain the effect, each of a Ca content, an Mg content, and a REM content is preferably 0.0005% or more. However, when any of the contents exceed 0.05%, the effect by the above-stated function is saturated, and the cost unnecessarily increases. Accordingly, each of the Ca content, the Mg content, and the REM content is 0.05% or less. Namely, it is preferable that at least one of "Ca: 0.0005% to 0.05%", "Mg: 0.0005% to 0.05%", and "REM: 0.0005% to 0.05%" is satisfied.

REM (rare-earth metal) indicates 17 kinds of elements as a total of Sc, Y, and lanthanoid, and the "REM content" means a total content of these 17 kinds of elements. Lanthanoid may be industrially added as a form of, for example, misch metal.

(Mo: 0% to 1%, Cu: 0% to 1%, Ni: 0% to 1%, W: 0% to 1%)

Each of Mo, Cu, Ni and W is an effective element to improve the hardenability and to stably secure the strength after quenching. Accordingly, one or more selected from the group consisting of these elements may be contained. To surely obtain the effect, an Mo content is preferably 0.03% or more, and each of a Cu content, an Ni content, and a W content is preferably 0.01% or more. However, when any of the contents exceeds 1%, the effects by the above-stated functions are saturated and the cost unnecessarily increases. Accordingly, each of the Mo content, the Cu content, the Ni content, and the W content is 1% or less. Namely, it is preferable that at least one of "Mo: 0.03% to 1%", "Cu: 0.01% to 1%", "Ni: 0.01% to 1%", and W: "0.01% to 1%" is satisfied.

(Nb: 0% to 1%, V: 0% to 1%)

Each of Nb and V suppresses the recrystallization of austenite, suppresses the grain growth by forming further fine carbides to refine austenite grains when the steel sheet for hot stamping is heated to the $Ac_3$ point or more in the hot stamping. Accordingly, one or two selected from the group consisting of these elements may be contained. To surely obtain the effect, each of an Nb content and a V content is preferably 0.005% or more. However, when any of the contents exceeds 1%, the effect by the above-stated function is saturated and the cost unnecessarily increases. Accordingly, each of the Nb content and the V content is 1% or less. Namely, it is preferable that at least one of "Nb: 0.005% to 1%" and "V: 0.005% to 1%" is satisfied.

Next, a steel structure of the steel sheet for hot stamping according to the present embodiment is described. The steel sheet for hot stamping has the steel structure expressed by bainite: 1% to 95%; ferrite: 5% to 94%; and the balance: one or more selected from the group consisting of pearlite, martensite and retained austenite. Each of numerical values relating to the steel structure is, for example, an average value of a whole of the steel sheet for hot stamping, but it can be represented by a numerical value relating to the steel structure at a point whose depth from a surface of the steel sheet for hot stamping is ¼ of a thickness of the steel sheet (hereinafter, this point may be described as a "¼ depth position"). For example, when the thickness of the steel sheet for hot stamping is 2.0 mm, it can be represented by a numerical value at a point whose depth from the surface is 0.50 mm. This is because the steel structure at the ¼ depth position represents an average steel structure in a thickness direction of a hot stamped steel sheet member. In the present invention, an area ratio of each phase or a structure measured at the ¼ depth position is regarded as the area ratio of each.

In general, in the hot stamping, C is solid-solved through austenite transformation by heating. The hardenability and the hardness after quenching become high by the solid-solution of C. A phase or a structure whose C concentration is high such as bainite, pearlite, martensite, cementite, and retained austenite becomes an initial point of austenitization in the heating. Accordingly, the more these area ratios are, the more the austenitization is accelerated. On the other hand, ferrite, whose C concentration is low, is difficult to be the initial point of austenitization, and the more the area ratio of ferrite is, the more the grain growth of austenite is suppressed.

(Area Ratio of Ferrite: 5% to 94%)

When the area ratio of ferrite is 5% or more, the initial point of austenitization is appropriately suppressed. Accordingly, it is possible to suppress the excessive grain growth of austenite, and to further improve the toughness after hot stamping. Accordingly, the area ratio of ferrite is 5% or more. To surely obtain the effect, the area ratio of ferrite is preferably 15% or more, more preferably 30% or more, and further preferably 40% or more.

When the area ratio of ferrite is 94% or less, the initial point of austenitization is appropriately secured. Accordingly, it is possible to promptly progress austenitization, and productivity improves. Therefore, the area ratio of ferrite is 94% or less.

Respective areas of polygonal ferrite, acicular ferrite, and bainitic ferrite are included in the area of ferrite, but an area of ferrite existing in pearlite is not included therein.

(Area Ratio of Bainite: 1% to 95%)

From a point of view of acceleration of austenite transformation in the heating, it is preferable that the phases or structures each of whose C concentration is high such as bainite, pearlite, martensite, cementite, and retained austenite are included. However, when the phase or the structure whose C content is excessively high is contained in the steel sheet for hot stamping, C is concentrated in austenite transformed from these phases or structures, and therefore, when the quenching is performed after that, a portion whose strength is locally high is generated in a microscopic point of view, and the local deformability and the toughness are easy to be lowered. When the C concentration is focused, the phase or the structure whose C concentration is the lowest is bainite among bainite, pearlite, martensite, cementite, and retained austenite. Therefore, the phase or the structure where the local concentration of C is difficult to occur is bainite. When the area ratio of bainite is 1% or more, the improvements in the local deformability and the toughness are remarkable. Accordingly, the area ratio of bainite is 1% or more. Besides, it is preferable that the structure other than ferrite is bainite. The area ratio of ferrite is 5% or more, and therefore, the area ratio of bainite is 95% or less.

A sum of the area ratio of ferrite and the area ratio of bainite is preferably 40% or more, more preferably 45% or more, further preferably 50% or more, and still further preferably 55% or more. The smaller the sum of the area ratio of ferrite and the area ratio of bainite is, the more the area ratios of pearlite, martensite, cementite, and retained austenite are. Therefore, C is difficult to diffuse, uneven quenching is easy to occur, and a hardness distribution is easy to be large. Accordingly, sufficient local deformability and toughness are difficult to be obtained. The sum of the area ratio of ferrite and the area ratio of bainite is further preferably 90% or more, and still further preferably 100%.

When the area ratio of bainite is 20% to 95%, it is preferable that the area ratio of ferrite is 5% to 80%. The more the area ratio of bainite is, the shorter the time required for austenitization in the quenching is. Accordingly, it is preferable to reduce the cost and the time.

When the area ratio of bainite is 1% or more and less than 20%, it is preferable that the area ratio of ferrite is 40% to 94%. The more the area ratio of ferrite is, the more excellent pre-formability can be obtained. In particular, when the area ratio of ferrite is 40% or more, improvement in the pre-formability is remarkable.

The balance other than ferrite and bainite is, for example, one or more of pearlite, martensite, cementite, or retained austenite. The smaller these contents are, the more preferable it is.

It is preferable that a plating layer containing Zn is formed at the surface of the steel sheet for hot stamping. Namely, a surface treated steel sheet is preferable as the steel sheet for hot stamping. Owing to the plating layer, an effect such as improvement in corrosion resistance of the hot stamped steel sheet member obtained by the hot stamping can be obtained. Kinds of the plating layer are not particularly limited, and an electroplated layer and a hot-dip plating layer are exemplified. As the electroplated layer, an electrogalvanized layer and an electroplated Zn—Ni alloy layer are exemplified. As the hot-dip plating layer, a hot-dip galvanized layer, an alloyed hot-dip galvanized layer, a hot-dip aluminum plating layer, a hot-dip Zn—Al alloy plating layer, a hot-dip Zn—Al—Mg alloy plating layer, and a hot-dip Zn—Al—Mg—Si alloy plating layer are exemplified.

A plating deposition amount is also not particularly limited, and may be a general one. Particularly when the plating layer is a pure galvanizing layer, the plating layer may be partially evaporated when the steel sheet for hot stamping is heated to the temperature of the $Ac_3$ point or more in the hot stamping. Accordingly, in particular, it is preferable to set the plating deposition amount to be large in case of electrogalvanizing, whose deposition amount tends to be smaller than the hot-dip plating layer. Due to reasons as stated above, the hot-dip galvanized based layer is preferable as the plating layer, and in particular, a hot-dip galvanized alloy layer (including the alloyed hot-dip galvanizing layer), whose melting point is more than that of pure zinc is preferable.

Next, a method of manufacturing the steel sheet for hot stamping is described. The steel sheet for hot stamping according to the present embodiment may obtain the desired effect as long as it includes the above-stated chemical composition and steel structure regardless of the method of manufacturing the same. Accordingly, the manufacturing method thereof is not particularly limited. However, according to the manufacturing method described below, it is possible to surely manufacture the steel sheet for hot stamping according to the present embodiment.

The manufacturing method of the steel sheet for hot stamping according to the present embodiment may be classified broadly into two kinds. One is a manufacturing method which does not include the plating treatment, and the other is a manufacturing method which includes the plating treatment.

First, the manufacturing method which does not include the plating treatment is described. In the manufacturing method, a steel ingot or a steel billet is hot-rolled, a steel sheet obtained by the hot-rolling is acid-pickled, a steel sheet obtained by the acid pickling treatment is cold-rolled, and a heat treatment of a steel sheet obtained by the cold-rolling is performed. A chemical composition of the steel ingot or the steel billet is substantially matched with the chemical composition of the steel sheet for hot stamping to be manufactured.

In the hot-rolling, the rolling is started at a temperature of 1050° C. or more, and thereafter, it is coiled at a temperature zone of 400° C. to 700° C.

The steel ingot or the steel billet may contain non-metal inclusions to be a cause to deteriorate the local deformability and the toughness of the hot stamped steel sheet member obtained by the quenching of the steel sheet for hot stamping. Accordingly, it is preferable to enable enough solid-solution of these non-metal inclusions in the hot-rolling of the steel ingot or the steel billet. When the steel ingot or the steel billet having the above-stated chemical composition is hot-rolled, the solid-solution of the non-metal inclusions is accelerated if the rolling is started at the temperature of 1050° C. or more. Therefore, the start temperature of the rolling is 1050° C. or more. For example, the rolling may be started after heating a steel ingot or a steel billet whose temperature is less than 1050° C. to the temperature of 1050° C. or more, or the rolling may be started at the temperature of 1050° C. or more without lowering the temperature of the steel ingot after continuous casting or the steel billet after bloom rolling to the temperature of less than 1050° C. A finish temperature of the hot-rolling is not particularly limited, but it is preferably 820° C. or more.

When a coiling temperature after the rolling is less than 400° C., ferrite cannot be enough secured, and therefore, strength of the hot-rolled steel sheet becomes excessively high. Accordingly, it is difficult to obtain the above-stated steel structure. Besides, in the cold-rolling, control of a load and control of flatness and thickness of the steel sheet become difficult, and as a result, proper cold-rolling cannot be performed or manufacturing efficiency is lowered. Accordingly, the coiling temperature is 400° C. or more.

When the coiling temperature after the rolling is 700° C. or more, the steel structure becomes any of only ferrite, a combination of ferrite and cementite, or perlite, and the steel structure containing bainite cannot be obtained. Accordingly, the coiling temperature is 700° C. or less. In general, when the coiling temperature is too high, a scale grows after the coiling, and therefore, scale flaws are easy to be generated. Besides, when the coiling temperature is too high, a steel sheet coil in high-temperature state is easy to be deformed by its own weight after the coiling, and scratches may be generated at a surface of the steel sheet coil caused by the deformation. A reason for the deformation is because non-transformed austenite remains after the coiling, and ferrite transformation may occur. If the ferrite transformation occurs after the coiling, the volume of the steel sheet coil expands in accordance with the ferrite transformation, and heat shrinkage occurs after that, and therefore, the steel sheet coil loses coiling tension.

Conditions of the acid pickling treatment are not particularly limited, and for example, it may be performed based on a typical condition. Skin pass rolling may be performed before or after the acid pickling treatment. For example, the flatness may be corrected and peeling of the scale may be accelerated owing to the skin pass rolling. An elongation percentage of the skin pass rolling is not particularly limited, and for example, it may be 0.3% or more and less than 3.0%.

Conditions of the cold-rolling are not particularly limited, and for example, it may be performed based on a typical condition. A reduction ratio is not particularly limited, and the reduction ratio is preferably 80% or less.

In the heat treatment (recrystallization annealing), the steel sheet is heated to a temperature zone of 700° C. to 840° C., cooled to a temperature of 500° C. or less at an average cooling rate of 5° C./sec to 100° C./sec, and thereafter, is retained at a temperature zone of 300° C. to 500° C. for 5 seconds to 600 seconds.

The heat treatment causes recrystallization. When a heating temperature of the heat treatment is less than 700° C., the recrystallization is not enough caused, the steel structure after the hot-rolling is easy to remain, and it is difficult to obtain the steel sheet for hot stamping having a desired steel structure. Accordingly, when the steel sheet for hot stamping is quenched, it is difficult to obtain stable characteristics. Therefore, the heating temperature of the heat treatment is 700° C. or more. When the heating temperature of the heat treatment exceeds 840° C., heat quantity to secure the temperature increases to raise a manufacturing cost, or to lower the manufacturing efficiency. Therefore the heating temperature of the heat treatment is 840° C. or less.

When the average cooling rate to the temperature of 500° C. or less is less than 5° C./sec, perlite or coarse cementite is excessively generated, and the desired steel structure cannot be obtained. Accordingly, enough hardenability cannot be obtained, and characteristics after the quenching may deteriorate. Accordingly, the average cooling rate to the temperature of 500° C. or less is 5° C./sec or more. When the average cooling rate to the temperature of 500° C. or less exceeds 100° C./sec, martensite or retained austenite is excessively generated, and the desired steel structure cannot be obtained. Therefore, the enough hardenability cannot be obtained, and the characteristics after the quenching may deteriorate. Accordingly, the average cooling rate to the temperature of 500° C. or less is 100° C./sec or less.

When the retention time at the temperature zone of 300° C. to 500° C. is less than 5 seconds, the desired steel structure cannot be obtained. Therefore, the retention time is 5 seconds or more. When the retention time exceeds 600 seconds, the manufacturing efficiency is remarkably lowered. Accordingly, the retention time is 600 seconds or less.

It is possible to manufacture the steel sheet for hot stamping according to the embodiment by a series of processes as stated above.

Next, the manufacturing method including the plating treatment is described. In the manufacturing method, a steel ingot or a steel billet is hot-rolled, a steel sheet obtained by the hot-rolling is acid-pickled, a steel sheet obtained by the acid pickling treatment is cold-rolled, a heat treatment of a steel sheet obtained by the cold-rolling is performed, and a plating treatment is performed. A chemical composition of the steel ingot or the steel billet is substantially matched with the chemical composition of the steel sheet for hot stamping to be manufactured. The hot-rolling, the acid pickling treatment, and the cold-rolling may be performed under the similar conditions as the manufacturing method which does not include the plating treatment.

In the heat treatment, the steel sheet is heated to a temperature zone of 700° C. to 840° C., is cooled to a temperature of 580° C. or less at an average cooling rate of 3° C./sec to 20° C./sec, and thereafter, is retained at a temperature zone of 500° C. to 570° C. for 5 seconds to 600 seconds.

The heat treatment causes recrystallization, but in this manufacturing method, the plating treatment is performed later, and therefore, conditions are different from those of the manufacturing method which does not include the plating treatment. The heating temperature of the heat treatment is 700° C. to 840° C. from the similar reason as that of the manufacturing method which does not include the plating treatment.

When the average cooling rate to the temperature of 580° C. or less is less than 3° C./sec, the desired steel structure cannot be obtained even if the plating treatment is performed. Accordingly, the average cooling rate to the temperature of 580° C. or less is 3° C./sec or more. When the average cooling rate to the temperature of 580° C. or less exceeds 20° C./sec, the desired steel structure cannot be obtained even if the plating treatment is performed. Therefore, the average cooling rate to the temperature of 580° C. or less is 20° C./sec or less.

When the retention time at the temperature zone of 500° C. to 570° C. is less than 5 seconds, the desired steel structure cannot be obtained. Therefore, the retention time is 5 seconds or more. When the retention time exceeds 600 seconds, the manufacturing efficiency is remarkably lowered. Accordingly, the retention time is 600 seconds or less.

In the plating treatment, the hot-dip galvanizing treatment is performed, and thereafter, an alloying treatment is performed at a temperature zone of 500° C. to 650° C.

Conditions of the hot-dip galvanizing treatment are not particularly limited, and for example, it may be performed based on a typical condition. A continuous hot-dip galvanizing equipment may be disposed to continue to an equipment of the above-stated heat treatment, and the heat treatment and the hot-dip galvanizing treatment may be continuously performed. Besides, the hot-dip galvanizing equipment may be independently disposed from the equipment of the heat treatment.

When a temperature of the alloying treatment is less than 500° C., the alloying may be insufficient, and an Fe content of an galvanized layer after the alloying treatment may be less than 8%. Accordingly, the temperature of the alloying treatment is 500° C. or more. When the temperature of the alloying treatment exceeds 650° C., the Fe content of the galvanized layer after the alloying treatment may exceed 20%. Therefore, the temperature of the alloying treatment is 650° C. or less. The skin pass rolling may be performed after the alloying treatment, and the effects are not affected by the process. For example, the flatness is corrected by the skin pass rolling. The elongation percentage of the skin pass rolling is not particularly limited, and may be similar to a typical elongation percentage.

The Fe content of the galvanized layer is preferably 8% or more. When the Fe content is 8% or more, an Fe—Zn solid-solution formation rate is increased and it is possible to more surely suppress a generation of a hot-dip galvanized phase in the hot stamping. The more the Fe content is, the more the effect is, on the other hand, the manufacturing efficiency is lowered. Accordingly, the Fe content is preferably 20% or less.

When the plating deposition amount is less than 35 g/m$^2$ per one side, a desired corrosion resistance of the hot stamped steel sheet member may not be able to be obtained. Besides, the manufacturing efficiency is easy to be lowered. Accordingly, the plating deposition amount is preferably 35 g/m$^2$ or more per one side.

(Hot Stamped Steel Sheet Member)

The hot stamping of the steel sheet for hot stamping according to the embodiment is performed, and thereby, the hot stamped steel sheet member is obtained. Accordingly, the chemical composition of the hot stamped steel sheet member substantially matches with that of the steel sheet for hot stamping. A steel structure of the hot stamped steel sheet member depends on conditions of the hot stamping, and in the embodiment of the present invention, the area ratio of martensite is 90% or more. When the area ratio of martensite is less than 90%, the fine local deformability and toughness cannot be obtained even if the chemical composition is a proper one. When the area ratio of martensite is 90% or more, it is possible to obtain the fine local deformability and toughness. Besides, a tensile-strength of the hot stamped steel sheet member may be 1600 MPa or less due to a relationship with the desired local deformability, toughness, and others.

EXAMPLE

Next, experiments performed by the present inventors are described.

First Experiment

In a first experiment, slabs having chemical compositions listed in Table 1 were used, and steel sheets for hot stamping having steel structures listed in Table 2 were manufactured. A part of the steel sheets for hot stamping was made to be a plated steel sheet by performing a plating treatment. "GA" in a field of a "steel sheet type" represents an alloyed hot-dip galvanized steel sheet, "EG" represents an electrogalvanized steel sheet, "GI" represents a hot-dip galvanized steel sheet, and "CR" represents a cold-rolled steel sheet.

In the manufacturing of the steel sheet for hot stamping, the hot-rolling was performed for the slabs having the chemical compositions listed in Table 1, and hot-rolled steel sheets with a thickness of 3.2 mm each were obtained. Then, the hot-rolled steel sheets were acid-pickled so as to obtain acid pickling steel sheets. A part of the acid pickling steel sheets was cold-rolled so as to obtain cold-rolled steel sheets with a thickness of 1.6 mm. Thereafter, the heat treatment and the plating treatment of the cold-rolled steel sheets were performed. In a part of tests, a part of the cold-rolling, heat treatment, and plating treatment was or were not performed. Conditions of the hot-rolling (a slab heating temperature and a coiling temperature), presence/absence of the cold-rolling, presence/absence and conditions of the heat treatment (a heating temperature, an average cooling rate to a temperature of 550° C. or less, a cooling stop temperature, and a retention time at the cooling stop temperature), and presence/absence of the plating treatment are listed in Table 2.

A temperature of a hot-dip galvanizing bath when the hot-dip galvanized steel sheet or the alloyed hot-dip galvanized steel sheet was manufactured was set to be 460° C. The plating deposition amount was set to be 45 g/m$^2$, and the Fe content of the plating was set to be 13%. The alloying treatment when the alloyed hot-dip galvanized steel sheet was manufactured was performed at 550° C. for 20 seconds.

The steel structure of each of the steel sheets for hot stamping was found as described below. Namely, nital etching was performed for a cross section which was in parallel to a rolling direction of the steel sheet for hot stamping, and the steel structures of 10 visual fields were observed at a ¼ depth position using a scanning electron microscope. A measurement magnification was set to be 1000 times in this observation.

TABLE 1

| STEEL TYPE No. | CHEMICAL COMPOSITION (MASS %) | | | | | | | | | | | | | | | | | | | [Mn] + 6.67 × [C] − 2.73 | 14 × [N] − 48/[Ti] | [Mn] + [Cr] |
|---|---|---|---|---|---|---|---|---|---|---|---|---|---|---|---|---|---|---|---|---|---|---|
| | C | Si | Mn | P | S | sol·Al | N | B | Ti | Cr | Bi | Ca | Me | REM | Mo | Cu | Ni | W | Nb | V | | | |
| 1 | 0.09 | 0.05 | 2.19 | 0.02 | 0.001 | 0.049 | 0.005 | 0.001 | — | — | — | — | — | — | — | — | — | — | — | — | 0.06 | −0.02 | 2.19 |
| 2 | 0.15 | 0.10 | 1.82 | 0.01 | 0.001 | 0.052 | 0.005 | 0.0005 | 0.03 | — | — | — | — | — | — | — | — | — | — | — | 0.09 | 0.01 | 1.82 |
| 3 | 0.10 | 0.08 | 1.84 | 0.01 | 0.002 | 0.043 | 0.004 | 0.001 | — | — | — | — | — | — | — | — | — | — | — | — | −0.22 | 0.01 | 1.84 |
| 4 | 0.08 | 0.19 | 2.49 | 0.01 | 0.001 | 0.047 | 0.005 | 0.001 | 0.03 | 0.20 | — | — | — | — | — | — | — | — | — | — | −0.29 | 0.03 | 2.69 |
| 5 | 0.12 | 0.13 | 2.21 | 0.01 | 0.002 | 0.039 | 0.006 | 0.003 | 0.05 | — | — | — | — | — | — | — | — | — | — | — | 0.28 | 0.03 | 2.21 |
| 6 | 0.18 | 0.02 | 1.65 | 0.01 | 0.001 | 0.044 | 0.005 | 0.002 | 0.03 | — | — | — | — | — | — | — | — | — | — | — | 0.12 | 0.01 | 1.65 |
| 7 | 0.18 | 0.15 | 1.87 | 0.01 | 0.001 | 0.051 | 0.004 | 0.003 | 0.02 | — | — | — | — | — | — | — | — | — | — | — | 0.34 | 0.01 | 1.87 |
| 8 | 0.16 | 0.06 | 2.22 | 0.01 | 0.001 | 0.044 | 0.003 | 0.003 | 0.02 | — | — | — | — | — | — | — | — | — | — | — | 0.56 | 0.01 | 2.22 |
| 9 | 0.15 | 0.12 | 2.05 | 0.05 | 0.001 | 0.038 | 0.004 | 0.003 | 0.03 | — | — | 0.02 | — | — | — | — | — | — | — | — | 0.32 | 0.02 | 2.05 |
| 10 | 0.10 | 0.12 | 3.20 | 0.01 | 0.001 | 0.043 | 0.004 | 0.003 | 0.03 | — | — | — | — | 0.0007 | — | — | — | — | — | — | 1.14 | 0.02 | 3.20 |
| 11 | 0.05 | 0.05 | 1.98 | 0.01 | 0.001 | 0.039 | 0.005 | 0.003 | 0.03 | — | — | — | — | — | — | — | — | — | — | — | −0.42 | 0.01 | 1.98 |
| 12 | 0.35 | 0.10 | 1.89 | 0.02 | 0.001 | 0.051 | 0.004 | 0.003 | 0.03 | — | — | — | — | — | — | — | — | — | — | — | 1.49 | 0.02 | 1.89 |
| 13 | 0.12 | 0.001 | 2.02 | 0.01 | 0.001 | 0.031 | 0.003 | 0.005 | 0.03 | — | — | — | — | — | — | — | — | — | — | — | 0.09 | 0.02 | 2.02 |
| 14 | 0.15 | 0.50 | 2.51 | 0.02 | 0.001 | 0.036 | 0.008 | 0.006 | 0.04 | — | — | — | — | — | — | — | — | — | — | — | 0.78 | 0.02 | 2.51 |
| 15 | 0.10 | 0.10 | 0.53 | 0.01 | 0.001 | 0.033 | 0.004 | 0.005 | 0.03 | — | — | — | — | — | — | — | — | — | — | — | −1.53 | 0.01 | 0.53 |
| 16 | 0.08 | 0.10 | 4.81 | 0.02 | 0.001 | 0.028 | 0.004 | 0.004 | 0.03 | — | — | — | — | — | — | — | — | — | — | — | 2.61 | 0.02 | 4.81 |
| 17 | 0.18 | 0.19 | 2.03 | 0.01 | 0.003 | 0.035 | 0.003 | 0.003 | 0.03 | — | — | — | — | — | — | — | — | — | — | — | 0.50 | 0.02 | 2.03 |
| 18 | 0.15 | 0.05 | 2.01 | 0.01 | 0.001 | 0.044 | 0.005 | 0.003 | 0.03 | — | — | — | — | — | — | — | — | — | — | — | 0.28 | 0.01 | 2.01 |
| 19 | 0.15 | 0.10 | 2.05 | 0.01 | 0.001 | 0.028 | 0.080 | 0.004 | 0.03 | — | — | — | — | — | — | — | — | — | — | — | 0.32 | −0.24 | 2.05 |
| 20 | 0.15 | 0.10 | 2.14 | 0.01 | 0.001 | 0.028 | 0.004 | 0.0001 | 0.03 | — | — | — | — | — | — | — | — | — | — | — | 0.41 | 0.02 | 2.14 |
| 21 | 0.15 | 0.10 | 1.98 | 0.01 | 0.001 | 0.028 | 0.004 | 0.100 | 0.03 | — | — | — | — | — | — | — | — | — | — | — | 0.25 | 0.01 | 1.98 |
| 22 | 0.22 | 0.07 | 1.89 | 0.01 | 0.001 | 0.042 | 0.003 | 0.002 | 0.02 | — | — | — | — | — | — | — | — | — | — | — | 0.63 | 0.01 | 1.89 |
| 23 | 0.19 | 0.02 | 1.48 | 0.01 | 0.002 | 0.039 | 0.003 | 0.002 | 0.02 | — | — | — | — | — | — | — | — | — | — | — | 0.02 | 0.01 | 1.48 |
| 24 | 0.10 | 0.06 | 2.29 | 0.02 | 0.001 | 0.039 | 0.003 | 0.002 | 0.02 | 0.20 | — | — | — | — | — | — | — | — | — | — | 0.23 | 0.01 | 2.49 |
| 25 | 0.15 | 0.08 | 2.08 | 0.01 | 0.001 | 0.043 | 0.003 | 0.001 | 0.02 | 0.15 | — | — | — | — | — | — | — | — | — | — | 0.02 | 0.00 | 2.23 |
| 26 | 0.05 | 0.19 | 2.49 | 0.01 | 0.002 | 0.047 | 0.001 | 0.001 | 0.02 | 0.20 | — | — | — | — | — | — | — | — | — | — | 0.09 | 0.01 | 2.69 |
| 27 | 0.13 | 0.07 | 2.00 | 0.01 | 0.001 | 0.041 | 0.005 | 0.002 | 0.03 | 0.20 | — | — | — | — | — | — | — | — | — | — | 0.14 | 0.00 | 2.20 |
| 28 | 0.18 | 0.05 | 1.65 | 0.01 | 0.001 | 0.044 | 0.005 | 0.003 | 0.03 | 0.15 | — | — | — | — | — | — | — | — | — | — | 0.12 | 0.01 | 1.80 |
| 29 | 0.18 | 0.05 | 1.87 | 0.01 | 0.001 | 0.050 | 0.004 | 0.003 | 0.02 | 0.15 | — | — | — | — | — | — | — | — | — | — | 0.25 | 0.01 | 2.02 |
| 30 | 0.16 | 0.15 | 2.22 | 0.02 | 0.001 | 0.044 | 0.003 | 0.003 | 0.02 | 0.15 | — | — | — | — | — | — | — | — | — | — | 0.34 | 0.01 | 2.37 |
| 31 | 0.15 | 0.06 | 2.05 | 0.05 | 0.001 | 0.038 | 0.004 | 0.003 | 0.03 | 0.15 | — | 0.02 | 0.002 | — | — | — | 0.1 | — | — | — | 0.56 | 0.02 | 2.20 |
| 32 | 0.10 | 0.12 | 3.22 | 0.01 | 0.001 | 0.043 | 0.004 | 0.003 | 0.03 | 0.15 | — | — | — | 0.0007 | — | — | — | — | — | — | 1.16 | 0.02 | 3.37 |
| 33 | 0.18 | 0.05 | 1.98 | 0.01 | 0.001 | 0.039 | 0.005 | 0.003 | 0.03 | 0.15 | — | — | — | — | — | — | — | — | — | — | 0.32 | 0.01 | 2.13 |
| 34 | 0.02 | 0.10 | 1.80 | 0.02 | 0.003 | 0.051 | 0.003 | 0.003 | 0.03 | 0.15 | — | — | — | — | — | — | — | — | — | — | −0.62 | 0.02 | 1.95 |
| 35 | 0.35 | 0.001 | 2.00 | 0.01 | 0.001 | 0.031 | 0.003 | 0.005 | 0.03 | 0.15 | — | — | — | — | — | — | — | — | — | — | 1.40 | 0.02 | 2.15 |
| 36 | 0.12 | 0.10 | 0.53 | 0.01 | 0.001 | 0.033 | 0.004 | 0.005 | 0.03 | 0.15 | — | — | — | — | — | — | — | — | — | — | 0.07 | 0.02 | 0.68 |
| 37 | 0.10 | 0.10 | 4.81 | 0.01 | 0.001 | 0.028 | 0.004 | 0.004 | 0.03 | 0.15 | — | — | — | — | — | — | — | — | — | — | −1.53 | 0.02 | 4.96 |
| 38 | 0.08 | 0.08 | 1.83 | 0.01 | 0.003 | 0.030 | 0.003 | 0.004 | 0.03 | 0.15 | — | — | — | — | 0.18 | — | — | — | — | — | 2.61 | 0.02 | 1.98 |
| 39 | 0.11 | 0.08 | 1.83 | 0.01 | 0.003 | 0.030 | 0.003 | 0.004 | 0.03 | 0.15 | — | — | — | — | — | — | — | — | — | — | −0.17 | 0.02 | 1.98 |
| 40 | 0.18 | 0.19 | 2.01 | 0.01 | 0.001 | 0.035 | 0.004 | 0.004 | 0.03 | 0.15 | — | — | — | — | — | — | — | — | — | — | 0.48 | 0.02 | 2.16 |
| 41 | 0.15 | 0.05 | 2.05 | 0.01 | 0.003 | 0.044 | 0.005 | 0.004 | 0.03 | 0.15 | — | — | — | — | — | — | — | — | — | — | 0.32 | 0.01 | 2.20 |
| 42 | 0.15 | 0.10 | 2.14 | 0.01 | 0.001 | 0.028 | 0.080 | 0.004 | 0.03 | 0.15 | — | — | — | — | — | — | — | — | — | — | 0.41 | −0.24 | 2.29 |
| 43 | 0.15 | 0.10 | 1.98 | 0.01 | 0.001 | 0.028 | 0.004 | 0.100 | 0.03 | 0.15 | — | — | — | — | — | — | — | — | — | — | 0.25 | 0.02 | 2.13 |
| 44 | 0.12 | 0.02 | 2.23 | 0.01 | 0.002 | 0.040 | 0.003 | 0.003 | — | 0.10 | — | — | — | — | — | — | — | — | — | — | 0.30 | −0.01 | 2.33 |

UNDERLINE INDICATES OUT OF RANGE OF PRESENT INVENTION OR OUT OF PREFERRED RANGE.

TABLE 2

| TEST NO. | STEEL TYPE NO. | STEEL SHEET FOR HOT STAMPING - STEEL STRUCTURE - FERRITE AREA RATIO (%) | BAINITE AREA RATIO (%) | BALANCE | STEEL SHEET TYPE | CONDITION OF HOT-ROLLING - SLAB HEATING TEMPERATURE (°C) | COILING TEMPERATURE (°C) | PRESENCE/ABSENCE OF COLD-ROLLING | HEAT TREATMENT (RECRYSTALLIZATION ANNEALING) CONDITION - PRESENCE/ABSENCE | HEATING TEMPERATURE (°C) | AVERAGE COOLING RATE (°C/sec) | COOLING STOP TEMPERATURE (°C) | RETENTION TIME | PRESENCE/ABSENCE OF PLATING | CLASSIFICATION |
|---|---|---|---|---|---|---|---|---|---|---|---|---|---|---|---|
| 1 | 1 | 75 | 6 | RETAINED AUSTENITE, MARTENSITE | GA | 1200 | 600 | PRESENT | PRESENT | 800 | 8 | 550 | 60 | PRESENT | EXAMPLE |
| 2 | 4 | 66 | 6 | RETAINED AUSTENITE, MARTENSITE | GA | 1200 | 600 | PRESENT | PRESENT | 800 | 8 | 550 | 60 | PRESENT | EXAMPLE |
| 3 | 5 | 90 | 9 | RETAINED AUSTENITE, MARTENSITE | GA | 1200 | 600 | PRESENT | PRESENT | 800 | 8 | 550 | 60 | PRESENT | EXAMPLE |
| 4 | 6 | 90 | 9 | RETAINED AUSTENITE, MARTENSITE | GA | 1200 | 600 | PRESENT | PRESENT | 800 | 8 | 550 | 60 | PRESENT | EXAMPLE |
| 5 | 7 | 65 | 8 | RETAINED AUSTENITE, MARTENSITE | GA | 1200 | 600 | PRESENT | PRESENT | 800 | 8 | 550 | 60 | PRESENT | EXAMPLE |
| 6 | 8 | 63 | 6 | RETAINED AUSTENITE, MARTENSITE | GA | 1200 | 600 | PRESENT | PRESENT | 800 | 8 | 550 | 60 | PRESENT | EXAMPLE |
| 7 | 9 | 40 | 8 | RETAINED AUSTENITE, MARTENSITE | CR | 1200 | 600 | PRESENT | PRESENT | 800 | 100 | 400 | 150 | ABSENT | EXAMPLE |
| 8 | 10 | 53 | 8 | RETAINED AUSTENITE, MARTENSITE | GA | 1200 | 600 | PRESENT | PRESENT | 800 | 8 | 550 | 60 | PRESENT | EXAMPLE |
| 9 | 1 | 52 | 7 | RETAINED AUSTENITE, MARTENSITE | GA | 1200 | 550 | PRESENT | PRESENT | 800 | 8 | 550 | 60 | PRESENT | EXAMPLE |
| 10 | 1 | 72 | 7 | RETAINED AUSTENITE, MARTENSITE | GA | 1200 | 425 | PRESENT | PRESENT | 800 | 8 | 550 | 60 | PRESENT | EXAMPLE |
| 11 | 4 | 85 | 10 | RETAINED AUSTENITE, MARTENSITE | GA | 1200 | 650 | ABSENT | PRESENT | 800 | 8 | 550 | 60 | PRESENT | EXAMPLE |
| 12 | 5 | 79 | 9 | PERLITE, MARTENSITE | GA | 1200 | 600 | PRESENT | PRESENT | 800 | 8 | 550 | 60 | PRESENT | EXAMPLE |
| 13 | 6 | 67 | 6 | RETAINED AUSTENITE, MARTENSITE | EG | 1200 | 600 | PRESENT | PRESENT | 800 | 8 | 400 | 150 | PRESENT | EXAMPLE |
| 14 | 7 | 86 | 9 | PERLITE, MARTENSITE | EG | 1200 | 600 | ABSENT | PRESENT | 800 | 8 | 550 | — | PRESENT | EXAMPLE |
| 15 | 8 | 52 | 7 | RETAINED AUSTENITE, MARTENSITE | GI | 1200 | 600 | PRESENT | PRESENT | 800 | 8 | 550 | 60 | PRESENT | EXAMPLE |
| 16 | 9 | 72 | 8 | PERLITE, MARTENSITE | GI | 1200 | 600 | ABSENT | PRESENT | 800 | 8 | 550 | 60 | PRESENT | EXAMPLE |
| 17 | 11 | 82 | 10 | RETAINED AUSTENITE, MARTENSITE | GA | 1200 | 600 | PRESENT | PRESENT | 800 | 8 | 550 | 60 | PRESENT | COMPARATIVE EXAMPLE |
| 18 | 12 | 73 | 8 | RETAINED AUSTENITE, MARTENSITE | GA | 1200 | 600 | PRESENT | PRESENT | 800 | 8 | 550 | 60 | PRESENT | COMPARATIVE EXAMPLE |
| 19 | 13 | 79 | 5 | RETAINED AUSTENITE, MARTENSITE | GA | 1200 | 600 | PRESENT | PRESENT | 800 | 8 | 550 | 60 | PRESENT | COMPARATIVE EXAMPLE |
| 20 | 14 | 85 | 6 | RETAINED AUSTENITE, MARTENSITE | GA | 1200 | 600 | PRESENT | PRESENT | 800 | 8 | 550 | 60 | PRESENT | COMPARATIVE EXAMPLE |
| 21 | 15 | 48 | 6 | RETAINED AUSTENITE, MARTENSITE | GA | 1200 | 600 | PRESENT | PRESENT | 800 | 8 | 550 | 60 | PRESENT | COMPARATIVE EXAMPLE |

TABLE 2-continued

| TEST No. | STEEL TYPE No. | STEEL SHEET FOR HOT STAMPING - STEEL STRUCTURE - FERRITE AREA RATIO (%) | BAINITE AREA RATIO (%) | BALANCE | STEEL SHEET TYPE | CONDITION OF HOT-ROLLING - SLAB HEATING TEMPERATURE (°C.) | COILING TEMPERATURE (°C.) | PRESENCE/ABSENCE OF COLD-ROLLING | HEAT TREATMENT (RECRYSTALLIZATION ANNEALING) - PRESENCE/ABSENCE | HEATING TEMPERATURE (°C.) | CONDITION - COOLING - AVERAGE COOLING RATE (°C./sec) | STOP TEMPERATURE (°C.) | RETENTION TIME | PRESENCE/ABSENCE OF PLATING | CLASSIFICATION |
|---|---|---|---|---|---|---|---|---|---|---|---|---|---|---|---|
| 22 | 16 | 52 | 5 | RETAINED AUSTENITE, MARTENSITE | GA | 1200 | 600 | PRESENT | PRESENT | 800 | 8 | 550 | 60 | PRESENT | COMPARATIVE EXAMPLE |
| 23 | 17 | 69 | 6 | RETAINED AUSTENITE, MARTENSITE | GA | 1200 | 600 | PRESENT | PRESENT | 800 | 8 | 550 | 60 | PRESENT | COMPARATIVE EXAMPLE |
| 24 | 18 | 82 | 9 | RETAINED AUSTENITE, MARTENSITE | GA | 1200 | 600 | PRESENT | PRESENT | 800 | 8 | 550 | 60 | PRESENT | COMPARATIVE EXAMPLE |
| 25 | 19 | 50 | 5 | RETAINED AUSTENITE, MARTENSITE | GA | 1200 | 600 | PRESENT | PRESENT | 800 | 8 | 550 | 60 | PRESENT | COMPARATIVE EXAMPLE |
| 26 | 20 | 71 | 7 | RETAINED AUSTENITE, MARTENSITE | GA | 1200 | 600 | PRESENT | PRESENT | 800 | 8 | 550 | 60 | PRESENT | COMPARATIVE EXAMPLE |
| 27 | 21 | 31 | 9 | RETAINED AUSTENITE, MARTENSITE | GA | 1200 | 600 | PRESENT | PRESENT | 800 | 8 | 550 | 60 | PRESENT | COMPARATIVE EXAMPLE |
| 28 | 22 | 15 | 82 | RETAINED AUSTENITE, MARTENSITE | GA | 1200 | 600 | PRESENT | PRESENT | 820 | 8 | 550 | 60 | PRESENT | COMPARATIVE EXAMPLE |
| 29 | 23 | 72 | 25 | MARTENSITE | GA | 1200 | 600 | PRESENT | PRESENT | 800 | 8 | 550 | 60 | PRESENT | COMPARATIVE EXAMPLE |
| 30 | 4 | 10 | 88 | MARTENSITE | CR | 1200 | 600 | PRESENT | PRESENT | 820 | 100 | 400 | 150 | ABSENT | COMPARATIVE EXAMPLE |
| 31 | 2 | 55 | 44 | MARTENSITE | CR | 1200 | 600 | PRESENT | PRESENT | 800 | 100 | 400 | 150 | ABSENT | COMPARATIVE EXAMPLE |
| 32 | 7 | 72 | 25 | RETAINED AUSTENITE, MARTENSITE | CR | 1200 | 600 | PRESENT | PRESENT | 800 | 100 | 400 | 150 | ABSENT | COMPARATIVE EXAMPLE |
| 33 | 7 | 35 | 18 | PERLITE, MARTENSITE | CR | 1200 | 600 | PRESENT | PRESENT | 800 | 70 | 500 | 150 | ABSENT | COMPARATIVE EXAMPLE |
| 34 | 6 | 2 | 18 | MARTENSITE | CR | 1200 | 600 | PRESENT | PRESENT | 820 | 120 | 400 | 150 | ABSENT | COMPARATIVE EXAMPLE |
| 35 | 6 | 90 | 0.5 | RETAINED AUSTENITE, PERLITE | GA | 1200 | 600 | PRESENT | PRESENT | 800 | 1 | 550 | 60 | PRESENT | COMPARATIVE EXAMPLE |
| 36 | 6 | 2 | 98 | NONE | GA | 1200 | 600 | PRESENT | PRESENT | 820 | 25 | 550 | 60 | PRESENT | COMPARATIVE EXAMPLE |
| 37 | 24 | 48 | 50 | RETAINED AUSTENITE, MARTENSITE | CR | 1200 | 600 | PRESENT | PRESENT | 820 | 70 | 400 | 150 | ABSENT | EXAMPLE |
| 38 | 25 | 64 | 30 | RETAINED AUSTENITE, MARTENSITE | CR | 1200 | 600 | PRESENT | PRESENT | 800 | 70 | 400 | 150 | ABSENT | EXAMPLE |
| 39 | 26 | 63 | 35 | RETAINED AUSTENITE, MARTENSITE | CR | 1200 | 600 | PRESENT | PRESENT | 800 | 70 | 400 | 150 | ABSENT | COMPARATIVE EXAMPLE |
| 40 | 27 | 45 | 55 | NONE | CR | 1200 | 600 | PRESENT | PRESENT | 820 | 70 | 400 | 150 | ABSENT | EXAMPLE |
| 41 | 28 | 49 | 50 | PERLITE | CR | 1200 | 600 | PRESENT | PRESENT | 820 | 70 | 400 | 150 | ABSENT | EXAMPLE |
| 42 | 29 | 30 | 62 | RETAINED AUSTENITE, MARTENSITE | CR | 1200 | 600 | PRESENT | PRESENT | 820 | 70 | 400 | 150 | ABSENT | EXAMPLE |
| 43 | 30 | 60 | 35 | PERLITE | CR | 1200 | 600 | PRESENT | PRESENT | 800 | 70 | 400 | 150 | ABSENT | EXAMPLE |
| 44 | 31 | 44 | 48 | RETAINED AUSTENITE, MARTENSITE | CR | 1200 | 600 | PRESENT | PRESENT | 820 | 70 | 400 | 150 | ABSENT | EXAMPLE |
| 45 | 32 | 48 | 47 | MARTENSITE | CR | 1200 | 600 | PRESENT | PRESENT | 800 | 70 | 400 | 150 | ABSENT | EXAMPLE |

TABLE 2-continued

| | | STEEL SHEET FOR HOT STAMPING | | | CONDITION OF HOT-ROLLING | | | | HEAT TREATMENT (RECRYSTALLIZATION ANNEALING) | | | | | | |
|---|---|---|---|---|---|---|---|---|---|---|---|---|---|---|---|
| | | STEEL STRUCTURE | | | | SLAB | | | | | CONDITION | | | | |
| | | | | | | | | | | | COOLING | | | | |
| TEST No. | STEEL TYPE No. | FERRITE AREA RATIO (%) | BAINITE AREA RATIO (%) | BALANCE | STEEL SHEET TYPE | HEATING TEMPER- ATURE (°C.) | COILING TEMPER- ATURE (°C.) | PRESENCE/ ABSENCE OF COLD- ROLLING | PRESENCE/ ABSENCE | HEATING TEMPER- ATURE (°C.) | AVERAGE COOLING RATE (°C./sec) | STOP TEMPER- ATURE (°C.) | RETENTION TIME | PRESENCE/ ABSENCE OF PLATING | CLASSI- FICATION |
| 46 | 27 | 80 | 12 | RETAINED AUSTENITE, MARTENSITE | CR | 1200 | 600 | PRESENT | PRESENT | 800 | 70 | 400 | 150 | ABSENT | EXAMPLE |
| 47 | 24 | 38 | 54 | RETAINED AUSTENITE, MARTENSITE, PERLITE | GA | 1200 | 550 | PRESENT | PRESENT | 820 | 8 | 550 | 60 | PRESENT | EXAMPLE |
| 48 | 24 | 32 | 67 | PERLITE | GA | 1200 | 425 | PRESENT | PRESENT | 820 | 8 | 550 | 60 | PRESENT | EXAMPLE |
| 49 | 24 | 48 | 48 | MARTENSITE, PERLITE | GA | 1200 | 650 | PRESENT | PRESENT | 820 | 8 | 550 | 60 | PRESENT | EXAMPLE |
| 50 | 27 | 85 | 8 | RETAINED AUSTENITE, MARTENSITE | GA | 1200 | 600 | PRESENT | PRESENT | 800 | 8 | 550 | 60 | PRESENT | EXAMPLE |
| 51 | 28 | 78 | 0.8 | PERLITE | GA | 1200 | 600 | PRESENT | PRESENT | 800 | 1 | 550 | 60 | PRESENT | COMPARATIVE EXAMPLE |
| 52 | 28 | 4 | 30 | MARTENSITE | CR | 1200 | 600 | PRESENT | PRESENT | 820 | 120 | 400 | 150 | ABSENT | COMPARATIVE EXAMPLE |
| 53 | 28 | 3 | 10 | PERLITE | GA | 1200 | 600 | PRESENT | PRESENT | 820 | 8 | 550 | 2 | PRESENT | COMPARATIVE EXAMPLE |
| 54 | 33 | 98 | 1 | PERLITE | GA | 1200 | 600 | PRESENT | PRESENT | 800 | 8 | 550 | 60 | PRESENT | COMPARATIVE EXAMPLE |
| 55 | 34 | 5 | 94 | MARTENSITE | GA | 1200 | 600 | PRESENT | PRESENT | 820 | 8 | 550 | 60 | PRESENT | COMPARATIVE EXAMPLE |
| 56 | 35 | 45 | 55 | NONE | CR | 1200 | 600 | PRESENT | PRESENT | 820 | 70 | 400 | 150 | ABSENT | COMPARATIVE EXAMPLE |
| 57 | 36 | 68 | 30 | PERLITE | CR | 1200 | 600 | PRESENT | PRESENT | 800 | 70 | 400 | 150 | ABSENT | COMPARATIVE EXAMPLE |
| 58 | 37 | 10 | 82 | RETAINED AUSTENITE, MARTENSITE | GA | 1200 | 600 | PRESENT | PRESENT | 820 | 8 | 550 | 60 | PRESENT | COMPARATIVE EXAMPLE |
| 59 | 38 | 60 | 38 | MARTENSITE | GA | 1200 | 600 | PRESENT | PRESENT | 800 | 8 | 550 | 60 | PRESENT | COMPARATIVE EXAMPLE |
| 60 | 39 | 79 | 6 | PERLITE | GA | 1200 | 600 | PRESENT | PRESENT | 800 | 8 | 550 | 60 | PRESENT | COMPARATIVE EXAMPLE |
| 61 | 40 | 82 | 9 | RETAINED AUSTENITE, PERLITE | CR | 1200 | 600 | PRESENT | PRESENT | 800 | 70 | 400 | 150 | ABSENT | COMPARATIVE EXAMPLE |
| 62 | 41 | 50 | 48 | PERLITE | CR | 1200 | 600 | PRESENT | PRESENT | 800 | 70 | 400 | 150 | ABSENT | COMPARATIVE EXAMPLE |
| 63 | 42 | 71 | 28 | MARTENSITE | GA | 1200 | 600 | PRESENT | PRESENT | 800 | 8 | 550 | 60 | PRESENT | COMPARATIVE EXAMPLE |
| 64 | 43 | 31 | 65 | RETAINED AUSTENITE, MARTENSITE | GA | 1200 | 600 | PRESENT | PRESENT | 820 | 8 | 550 | 60 | PRESENT | COMPARATIVE EXAMPLE |
| 65 | 44 | 41 | 52 | RETAINED AUSTENITE, MARTENSITE | GA | 1200 | 600 | PRESENT | PRESENT | 820 | 8 | 550 | 60 | PRESENT | EXAMPLE |
| 66 | 3 | 71 | 28 | MARTENSITE | GA | 1200 | 600 | PRESENT | PRESENT | 800 | 8 | 550 | 60 | PRESENT | COMPARATIVE EXAMPLE |

TABLE 2-continued

| TEST No. | STEEL TYPE No. | STEEL SHEET FOR HOT STAMPING — STEEL STRUCTURE — FERRITE AREA RATIO (%) | BAINITE AREA RATIO (%) | BALANCE | STEEL SHEET TYPE | CONDITION OF HOT-ROLLING — SLAB HEATING TEMPERATURE (°C) | COILING TEMPERATURE (°C) | PRESENCE/ABSENCE OF COLD-ROLLING | HEAT TREATMENT (RECRYSTALLIZATION ANNEALING) — PRESENCE/ABSENCE | CONDITION — HEATING TEMPERATURE (°C) | AVERAGE COOLING RATE (°C/sec) | COOLING STOP TEMPERATURE (°C) | RETENTION TIME | PRESENCE/ABSENCE OF PLATING | CLASSIFICATION |
|---|---|---|---|---|---|---|---|---|---|---|---|---|---|---|---|
| 67 | 2 | — | — | — | — | 1200 | <u>350</u> | — | — | — | — | — | — | — | COMPARATIVE EXAMPLE |
| 68 | 2 | — | — | — | — | 1200 | <u>750</u> | — | — | — | — | — | — | — | COMPARATIVE EXAMPLE |
| 69 | 25 | — | — | — | — | 1200 | <u>350</u> | — | — | — | — | — | — | — | COMPARATIVE EXAMPLE |
| 70 | 25 | — | — | — | — | 1200 | <u>750</u> | — | — | — | — | — | — | — | COMPARATIVE EXAMPLE |

UNDERLINE INDICATES OUT OF RANGE OF PRESENT INVENTION

A hot stamping test was performed using a hot stamping tester. In this test, a test piece was heated until a surface temperature reached 900° C. in a heating furnace, was retained at 900° C. for two minutes, then was pulled out of the heating furnace. Thereafter, the test piece was naturally cooled to a predetermined temperature (a quenching start temperature), and a rapid quenching treatment was performed at the predetermined temperature. The predetermined temperatures were 800° C. or 500° C. A shape of the hot stamped steel sheet member obtained by the hot stamping was set to be a flat sheet. A size of the test piece for the hot stamping test was set to be 200 mm in width and 80 mm in length.

A measurement of tensile strength after the quenching was also performed. In this measurement, a JIS No. 5 tensile test piece was obtained in a direction perpendicular to the rolling direction, the tensile test was performed based on JIS Z 2241, and the tensile strength (TS) was measured.

A hardness test after the quenching was also performed. In the hardness test, Vickers hardness of a cross section in parallel to the rolling direction was measured. This measurement was performed based on JIS Z 2244, and a measurement load was set to be 98 kN. In this measurement, the hardness was measured at 10 points each kept off for 200 μm at the same depth position from a surface of a sample, and an average value was found. The Vickers hardness when the quenching was started at 800° C. (Hv800) and the Vickers hardness when the quenching was started at 500° C. (Hv500) were found, and a difference between these values was also found. Besides, an area ratio of martensite of the steel sheet in which the quenching was started at 800° C. was also found.

An evaluation of the local deformability after the quenching was also performed. In this evaluation, a hole expansion ratio was measured according to a "JFST1001 hole expansion test method" of the Japan Iron and Steel Federation Standard.

An evaluation of the toughness after the quenching was also performed. In this evaluation, an absorbed energy of the steel sheet in which the quenching treatment was performed from 800° C. was measured by a Charpy impact test. In the measurement of the absorbed energy, three pieces were superposed as for one in which the cold-rolling was not performed, and six pieces were superposed as for one in which the cold-rolling was performed, they were each fastened with screws to manufacture test pieces with a total thickness of 9.6 mm. The test piece was a V-notch Charpy test piece described in JIS Z 2202. A test method was based on a method described in JIS 2242, and the absorbed energy at −40° C. was investigated. The absorbed energies obtained from the Charpy test pieces in which notches were made in a 0° direction or a 90° direction relative to the rolling direction were represented by J0, J90, respectively.

These results are listed in Table 3. In the evaluation of the hardenability, ones in which the difference between Hv800 and Hv500 was 15 Hv or less, and the area ratio of martensite was 90% or more were evaluated as "superior", and the others were evaluated as "inferior". In the evaluation of the local deformability, ones in which the hole expansion ratio was 40% or more were evaluated as "superior", and the others were evaluated as "inferior". In the evaluation of the toughness, ones in which both J0 and J90 were 30 J or more and a value of J0/J90 was 0.5 or more were evaluated as "superior", and the others were evaluated as "inferior". The value of J0/J90 reflects anisotropy of the toughness.

TABLE 3

| TEST No. | STEEL TYPE No. | THICK-NESS (mm) | TS (MPa) | MAR-TEN-SITE AREA RATIO (%) | Hv 800 | Hv 500 | Hv800-Hv500 | HARDEN-ABILITY | HOLE EX-PAN-SION RATIO (%) | LOCAL DEFORM-ABILITY | J0 (J/cm$^2$) | J90 (J/cm$^2$) | J0/J90 | TOUGH-NESS | CLASSIFI-CATION |
|---|---|---|---|---|---|---|---|---|---|---|---|---|---|---|---|
| 1 | 1 | 1.6 | 1221 | 92 | 381 | 372 | 9 | SUPERIOR | 50 | SUPERIOR | 40 | 50 | 0.80 | SUPERIOR | EXAMPLE |
| 2 | 4 | 1.6 | 1188 | 96 | 370 | 368 | 2 | SUPERIOR | 107 | SUPERIOR | 46 | 52 | 0.90 | SUPERIOR | EXAMPLE |
| 3 | 5 | 1.6 | 1321 | 91 | 415 | 410 | 6 | SUPERIOR | 56 | SUPERIOR | 41 | 56 | 0.73 | SUPERIOR | EXAMPLE |
| 4 | 6 | 1.6 | 1521 | 94 | 483 | 477 | 5 | SUPERIOR | 49 | SUPERIOR | 44 | 55 | 0.79 | SUPERIOR | EXAMPLE |
| 5 | 7 | 1.6 | 1521 | 97 | 483 | 483 | 0 | SUPERIOR | 119 | SUPERIOR | 47 | 50 | 0.94 | SUPERIOR | EXAMPLE |
| 6 | 8 | 1.6 | 1454 | 93 | 460 | 459 | 1 | SUPERIOR | 59 | SUPERIOR | 43 | 52 | 0.84 | SUPERIOR | EXAMPLE |
| 7 | 9 | 1.6 | 1421 | 97 | 449 | 441 | 8 | SUPERIOR | 48 | SUPERIOR | 47 | 58 | 0.81 | SUPERIOR | EXAMPLE |
| 8 | 10 | 1.6 | 1254 | 91 | 393 | 392 | 1 | SUPERIOR | 52 | SUPERIOR | 41 | 51 | 0.81 | SUPERIOR | EXAMPLE |
| 9 | 1 | 1.6 | 1221 | 94 | 381 | 375 | 6 | SUPERIOR | 58 | SUPERIOR | 44 | 56 | 0.78 | SUPERIOR | EXAMPLE |
| 10 | 1 | 1.6 | 1221 | 91 | 381 | 381 | 1 | SUPERIOR | 47 | SUPERIOR | 41 | 51 | 0.80 | SUPERIOR | EXAMPLE |
| 11 | 4 | 1.6 | 1188 | 97 | 370 | 366 | 4 | SUPERIOR | 58 | SUPERIOR | 47 | 54 | 0.87 | SUPERIOR | EXAMPLE |
| 12 | 5 | 3.2 | 1321 | 98 | 415 | 415 | 0 | SUPERIOR | 126 | SUPERIOR | 48 | 50 | 0.95 | SUPERIOR | EXAMPLE |
| 13 | 6 | 1.6 | 1521 | 97 | 483 | 475 | 8 | SUPERIOR | 47 | SUPERIOR | 47 | 58 | 0.82 | SUPERIOR | EXAMPLE |
| 14 | 7 | 3.2 | 1521 | 92 | 483 | 478 | 5 | SUPERIOR | 57 | SUPERIOR | 42 | 55 | 0.77 | SUPERIOR | EXAMPLE |
| 15 | 8 | 1.6 | 1454 | 95 | 460 | 455 | 5 | SUPERIOR | 44 | SUPERIOR | 45 | 55 | 0.81 | SUPERIOR | EXAMPLE |
| 16 | 9 | 3.2 | 1421 | 100 | 449 | 446 | 2 | SUPERIOR | 106 | SUPERIOR | 50 | 52 | 0.95 | SUPERIOR | EXAMPLE |
| 17 | 11 | 1.6 | 1088 | 96 | 336 | 152 | 184 | INFERIOR | 58 | SUPERIOR | 46 | 58 | 0.79 | SUPERIOR | COMPAR-ATIVE EXAMPLE |
| 18 | 12 | 1.6 | 2088 | 93 | 674 | 667 | 7 | SUPERIOR | 35 | INFERIOR | 29 | 29 | 1.00 | INFERIOR | COMPAR-ATIVE EXAMPLE |
| 19 | 13 | 1.6 | 1321 | 93 | 415 | 387 | 28 | INFERIOR | 57 | SUPERIOR | 43 | 58 | 0.74 | SUPERIOR | COMPAR-ATIVE EXAMPLE |
| 20 | 14 | 1.6 | 1421 | 84 | 449 | 447 | 2 | SUPERIOR | 38 | INFERIOR | 25 | 29 | 0.85 | INFERIOR | COMPAR-ATIVE EXAMPLE |
| 21 | 15 | 1.6 | 1254 | 92 | 393 | 283 | 110 | INFERIOR | 42 | SUPERIOR | 42 | 59 | 0.71 | SUPERIOR | COMPAR-ATIVE EXAMPLE |

TABLE 3-continued

| TEST No. | STEEL TYPE No. | THICK-NESS (mm) | TS (MPa) | MAR-TEN-SITE AREA RATIO (%) | Hv 800 | Hv 500 | Hv800-Hv500 | HARDEN-ABILITY | HOLE EX-PAN-SION RATIO (%) | LOCAL DEFORM-ABILITY | J0 (J/cm²) | J90 (J/cm²) | J0/J90 | TOUGH-NESS | CLASSIFI-CATION |
|---|---|---|---|---|---|---|---|---|---|---|---|---|---|---|---|
| 22 | <u>16</u> | 1.6 | 1188 | 95 | 370 | 365 | 5 | SUPERIOR | 45 | SUPERIOR | <u>22</u> | <u>29</u> | 0.77 | INFERIOR | COMPARATIVE EXAMPLE |
| 23 | <u>17</u> | 1.6 | 1521 | 91 | 483 | 479 | 4 | SUPERIOR | 43 | SUPERIOR | <u>20</u> | <u>24</u> | 0.86 | INFERIOR | COMPARATIVE EXAMPLE |
| 24 | <u>18</u> | 1.6 | 1421 | 97 | 449 | 443 | 6 | SUPERIOR | 48 | SUPERIOR | <u>29</u> | 60 | <u>0.48</u> | INFERIOR | COMPARATIVE EXAMPLE |
| 25 | <u>19</u> | 1.6 | 1421 | 91 | 449 | 448 | 1 | SUPERIOR | <u>31</u> | INFERIOR | <u>21</u> | <u>29</u> | 0.72 | INFERIOR | COMPARATIVE EXAMPLE |
| 26 | <u>20</u> | 1.6 | 1421 | 99 | 449 | 401 | <u>48</u> | INFERIOR | 48 | SUPERIOR | 49 | 54 | 0.92 | SUPERIOR | COMPARATIVE EXAMPLE |
| 27 | <u>21</u> | 1.6 | 1421 | 100 | 449 | 449 | 0 | SUPERIOR | 50 | SUPERIOR | <u>21</u> | <u>28</u> | 0.75 | INFERIOR | COMPARATIVE EXAMPLE |
| 28 | <u>22</u> | 1.6 | <u>1654</u> | 99 | 550 | 540 | 10 | SUPERIOR | <u>38</u> | INFERIOR | <u>29</u> | <u>29</u> | 1.00 | INFERIOR | COMPARATIVE EXAMPLE |
| 29 | <u>23</u> | 1.6 | 1488 | <u>87</u> | 513 | 493 | 20 | INFERIOR | 64 | SUPERIOR | 52 | 64 | 0.81 | SUPERIOR | COMPARATIVE EXAMPLE |
| 30 | 4 | 1.6 | 1188 | 97 | 378 | 375 | 3 | SUPERIOR | 69 | SUPERIOR | 68 | 73 | 0.93 | SUPERIOR | EXAMPLE |
| 31 | 2 | 1.6 | 1421 | 98 | 464 | 458 | 6 | SUPERIOR | 48 | SUPERIOR | 59 | 62 | 0.95 | SUPERIOR | EXAMPLE |
| 32 | 7 | 1.6 | 1521 | 96 | 501 | 495 | 6 | SUPERIOR | 44 | SUPERIOR | 46 | 50 | 0.92 | SUPERIOR | EXAMPLE |
| 33 | 7 | 1.6 | 1521 | 93 | 501 | 495 | 6 | SUPERIOR | 46 | SUPERIOR | 32 | 35 | 0.91 | SUPERIOR | EXAMPLE |
| 34 | 6 | 1.6 | 1521 | 98 | 500 | 493 | 7 | SUPERIOR | 67 | SUPERIOR | <u>27</u> | <u>29</u> | 0.93 | INFERIOR | COMPARATIVE EXAMPLE |
| 35 | 6 | 1.6 | 1521 | 93 | 496 | 492 | 4 | SUPERIOR | <u>35</u> | INFERIOR | <u>28</u> | <u>29</u> | 0.97 | INFERIOR | COMPARATIVE EXAMPLE |
| 36 | 6 | 1.6 | 1521 | <u>68</u> | 505 | 495 | 10 | SUPERIOR | 65 | SUPERIOR | <u>21</u> | 31 | 0.68 | INFERIOR | COMPARATIVE EXAMPLE |
| 37 | 24 | 1.6 | 1254 | 99 | 405 | 398 | 7 | SUPERIOR | 89 | SUPERIOR | 70 | 82 | 0.85 | SUPERIOR | EXAMPLE |
| 38 | 25 | 1.6 | 1254 | 91 | 405 | 397 | 8 | SUPERIOR | 93 | SUPERIOR | 77 | 95 | 0.81 | SUPERIOR | EXAMPLE |
| 39 | <u>26</u> | 1.6 | 1088 | 96 | 343 | 290 | <u>53</u> | INFERIOR | 131 | SUPERIOR | 98 | 101 | 0.97 | SUPERIOR | COMPARATIVE EXAMPLE |
| 40 | 27 | 1.6 | 1354 | 99 | 443 | 435 | 8 | SUPERIOR | 107 | SUPERIOR | 71 | 80 | 0.89 | SUPERIOR | EXAMPLE |
| 41 | 28 | 1.6 | 1521 | 94 | 505 | 495 | 10 | SUPERIOR | 51 | SUPERIOR | 51 | 55 | 0.92 | SUPERIOR | EXAMPLE |
| 42 | 29 | 1.6 | 1481 | 97 | 505 | 496 | 9 | SUPERIOR | 119 | SUPERIOR | 58 | 60 | 0.97 | SUPERIOR | EXAMPLE |
| 43 | 30 | 1.6 | 1454 | 93 | 480 | 473 | 7 | SUPERIOR | 59 | SUPERIOR | 51 | 58 | 0.88 | SUPERIOR | EXAMPLE |
| 44 | 31 | 1.6 | 1421 | 97 | 468 | 460 | 8 | SUPERIOR | 51 | SUPERIOR | 52 | 54 | 0.96 | SUPERIOR | EXAMPLE |
| 45 | 32 | 1.6 | 1254 | 91 | 405 | 403 | 2 | SUPERIOR | 114 | SUPERIOR | 82 | 99 | 0.83 | SUPERIOR | EXAMPLE |
| 46 | 27 | 1.6 | 1354 | 98 | 443 | 435 | 8 | SUPERIOR | 71 | SUPERIOR | 49 | 58 | 0.84 | SUPERIOR | EXAMPLE |
| 47 | 24 | 1.6 | 1254 | 94 | 405 | 398 | 7 | SUPERIOR | 98 | SUPERIOR | 68 | 72 | 0.94 | SUPERIOR | EXAMPLE |
| 48 | 24 | 1.6 | 1187 | 91 | 405 | 398 | 7 | SUPERIOR | 83 | SUPERIOR | 92 | 100 | 0.92 | SUPERIOR | EXAMPLE |
| 49 | 24 | 1.6 | 1028 | 97 | 343 | 337 | 6 | SUPERIOR | 137 | SUPERIOR | 108 | 125 | 0.86 | SUPERIOR | EXAMPLE |
| 50 | 27 | 1.6 | 1234 | 98 | 443 | 435 | 8 | SUPERIOR | 126 | SUPERIOR | 69 | 79 | 0.87 | SUPERIOR | EXAMPLE |
| 51 | 28 | 1.6 | 1430 | 92 | 405 | 397 | 8 | SUPERIOR | <u>32</u> | INFERIOR | <u>18</u> | <u>19</u> | 0.95 | INFERIOR | COMPARATIVE EXAMPLE |
| 52 | 28 | 1.6 | 1399 | 94 | 405 | 397 | 8 | SUPERIOR | <u>10</u> | INFERIOR | <u>26</u> | 38 | 0.68 | INFERIOR | COMPARATIVE EXAMPLE |
| 53 | 28 | 1.6 | 1418 | 91 | 505 | 495 | 10 | SUPERIOR | 49 | SUPERIOR | 36 | 37 | 0.97 | SUPERIOR | EXAMPLE |
| 54 | <u>33</u> | 1.6 | 647 | 92 | 181 | 141 | 40 | INFERIOR | 58 | SUPERIOR | 57 | 58 | 0.97 | SUPERIOR | COMPARATIVE EXAMPLE |
| 55 | <u>34</u> | 1.6 | <u>2088</u> | 99 | 674 | 667 | 7 | SUPERIOR | <u>14</u> | INFERIOR | <u>24</u> | <u>29</u> | 0.83 | INFERIOR | COMPARATIVE EXAMPLE |
| 56 | <u>35</u> | 1.6 | 1242 | 94 | 349 | 328 | <u>21</u> | INFERIOR | 68 | SUPERIOR | 51 | 58 | 0.88 | SUPERIOR | COMPARATIVE EXAMPLE |

TABLE 3-continued

| TEST No. | STEEL TYPE No. | THICK-NESS (mm) | TS (MPa) | MAR-TEN-SITE AREA RATIO (%) | Hv 800 | Hv 500 | Hv800-Hv500 | HARDEN-ABILITY | HOLE EX-PAN-SION RATIO (%) | LOCAL DEFORM-ABILITY | J0 (J/cm²) | J90 (J/cm²) | J0/J90 | TOUGH-NESS | CLASSIFI-CATION |
|---|---|---|---|---|---|---|---|---|---|---|---|---|---|---|---|
| 57 | 36 | 1.6 | 1180 | 89 | 399 | 270 | 129 | INFERIOR | 52 | SUPERIOR | 42 | 59 | 0.71 | SUPERIOR | COMPAR-ATIVE EXAMPLE |
| 58 | 37 | 1.6 | 1188 | 100 | 370 | 367 | 3 | SUPERIOR | 7 | INFERIOR | 24 | 31 | 0.77 | INFERIOR | COMPAR-ATIVE EXAMPLE |
| 59 | 38 | 1.6 | 1288 | 98 | 405 | 388 | 17 | INFERIOR | 66 | SUPERIOR | 38 | 44 | 0.86 | SUPERIOR | COMPAR-ATIVE EXAMPLE |
| 60 | 39 | 1.6 | 1521 | 98 | 483 | 479 | 4 | SUPERIOR | 58 | SUPERIOR | 25 | 29 | 0.86 | INFERIOR | COMPAR-ATIVE EXAMPLE |
| 61 | 40 | 1.6 | 1421 | 97 | 449 | 443 | 6 | SUPERIOR | 48 | SUPERIOR | 28 | 59 | 0.47 | INFERIOR | COMPAR-ATIVE EXAMPLE |
| 62 | 41 | 1.6 | 1444 | 97 | 457 | 456 | 1 | SUPERIOR | 21 | INFERIOR | 29 | 32 | 0.91 | INFERIOR | COMPAR-ATIVE EXAMPLE |
| 63 | 42 | 1.6 | 1149 | 84 | 357 | 340 | 17 | INFERIOR | 58 | SUPERIOR | 61 | 69 | 0.88 | SUPERIOR | COMPAR-ATIVE EXAMPLE |
| 64 | 43 | 1.6 | 1313 | 99 | 412 | 409 | 3 | SUPERIOR | 57 | SUPERIOR | 24 | 29 | 0.83 | INFERIOR | COMPAR-ATIVE EXAMPLE |
| 65 | 44 | 1.6 | 1189 | 97 | 398 | 388 | 10 | SUPERIOR | 69 | SUPERIOR | 67 | 77 | 0.87 | SUPERIOR | COMPAR-ATIVE EXAMPLE |
| 66 | 3 | 1.6 | 1201 | 98 | 385 | 178 | 207 | INFERIOR | 81 | SUPERIOR | 57 | 72 | 0.79 | SUPERIOR | COMPAR-ATIVE EXAMPLE |

UNDERLINE IN STEEL TYPE No. COLUMN INDICATES OUT OF RANGE OF PRESENT INVENTION.
UNDERLINE IN OTHER COLUMNS INDICATES OUT OF DESIRED RANGE.

As it can be seen from Table 3, the steel sheets for hot stamping of the example which were within a range of the present invention had the good hardenability, local deformability, and toughness. Besides, these had an appropriate tensile strength of 1600 MPa or less after the quenching. On the other hand, at least one characteristic was deteriorated in the comparative examples.

In each of tests No. 67 and No. 69, in which the coiling temperature was set at 350° C., the proper cold-rolling could not be performed, as listed in Table 2. In each of tests No. 68 and No. 70, in which the coiling temperature was set at 750° C., deformation was generated after the coiling, and therefore, post processes could not be performed.

Second Experiment

In a second experiment, an evaluation of a heating time required for the quenching of the steel sheet was performed. In this evaluation, the steel sheet was heated up to 900° C. before the quenching, and both of the Vickers hardness after retaining at 900° C. for four minutes and quenching and the Vickers hardness after retaining at 900° C. for 1.5 minutes and quenching were measured. Then, a difference between the two kinds of Vickers hardness was found. One in which the difference was 15 or less was evaluated as "⊙", and one in which the difference was over 15 and 30 or less was evaluated as "○". The results were listed in Table 4.

TABLE 4

| | | STEEL STRUCTURE | | | | |
|---|---|---|---|---|---|---|
| TEST No. | STEEL TYPE No. | FERRITE AREA RATIO (%) | BAINITE AREA RATIO (%) | BALANCE | EVALUATION OF HEATING TIME | CLASSIFICATION |
| 30 | 4 | 10 | 88 | MARTENSITE | ⊙ | EXAMPLE |
| 31 | 2 | 55 | 44 | MARTENSITE | ⊙ | EXAMPLE |
| 32 | 7 | 72 | 25 | MARTENSITE | ⊙ | EXAMPLE |
| 33 | 7 | 35 | 18 | PERLITE, MARTENSITE | ○ | EXAMPLE |

As listed in Table 4, enough austenitization was caused by retaining for 1.5 minutes and the difference of the Vickers hardness was 15 or less in the tests No. 30 to No. 32, though enough austenitization was not caused by retaining for 1.5 minutes and the difference of the Vickers hardness was over 15 in the test No. 33, in which the area ratio of bainite was less than 20%.

Third Experiment

In a third experiment, an evaluation of pre-formability of steel sheets each of whose area ratio of bainite is 1% or more and less than 20% was performed. In this evaluation, the tensile test of the steel sheet for hot stamping before the quenching was performed. In this measurement, a JIS No. 5 tensile test piece was prepared in a direction perpendicular to the rolling direction, the tensile test was performed based on JIS Z 2241, and a total elongation (T-EL) was measured. One in which the total elongation (T-EL) was 10% or more was evaluated as "◉", and the others were evaluated as "○". The results are listed in Table 5.

TABLE 5

| | | STEEL STRUCTURE | | | | |
|---|---|---|---|---|---|---|
| TEST No. | STEEL TYPE No. | FERRITE AREA RATIO (%) | BAINITE AREA RATIO (%) | BALANCE | PRE-FORMABILITY | CLASSIFICATION |
| 3 | 5 | 90 | 9 | RETAINED AUSTENITE, MARTENSITE | ◉ | EXAMPLE |
| 6 | 8 | 63 | 6 | RETAINED AUSTENITE, MARTENSITE | ◉ | EXAMPLE |
| 8 | 10 | 53 | 8 | RETAINED AUSTENITE, MARTENSITE | ◉ | EXAMPLE |
| 33 | 7 | 35 | 18 | PERILTE, MARTENSITE | ○ | EXAMPLE |

As listed in Table 5, the good pre-formability could be obtained in the test No. 33, in which the area ratio of ferrite was less than 40%, and excellent pre-formability could be obtained in each of tests No. 3, No. 6, and No. 8, in which the area ratio of ferrite was 40% or more.

Fourth Experiment

In a fourth experiment, evaluations of the local deformability and the toughness as same as the first experiment were performed as for the hot stamped steel sheet members. The results were listed in Table 6. The heating temperature before the quenching was set to be 900° C., the retention time at 900° C. was set to be four minutes, and the hot stamped steel sheet members was naturally cooled in atmosphere at a room temperature to 200° C. in the quenching, in manufacturing of the hot stamped steel sheet members of the tests No. 71, No. 72, and No. 73.

TABLE 6

| TEST No. | STEEL TYPE No. | THICKNESS (mm) | TS (MPa) | MARTENSITE AREA RATIO (%) | HOLE EXPANSION RATIO (%) | LOCAL DEFORM-ABILITY | J0 (J/cm$^2$) | J90 (J/cm$^2$) | J0/J90 | TOUGHNESS | CLASSIFICATION |
|---|---|---|---|---|---|---|---|---|---|---|---|
| 1 | 1 | 1.6 | 1221 | 92 | 50 | SUPERIOR | 40 | 50 | 0.80 | SUPERIOR | EXAMPLE |
| 31 | 2 | 1.6 | 1421 | 98 | 48 | SUPERIOR | 59 | 62 | 0.95 | SUPERIOR | EXAMPLE |

TABLE 6-continued

| TEST No. | STEEL TYPE No. | THICKNESS (mm) | TS (MPa) | MARTENSITE AREA RATIO (%) | HOLE EXPANSION RATIO (%) | LOCAL DEFORM-ABILITY | J0 (J/cm$^2$) | J90 (J/cm$^2$) | J0/J90 | TOUGHNESS | CLASSIFICATION |
|---|---|---|---|---|---|---|---|---|---|---|---|
| 37 | 24 | 1.6 | 1254 | 99 | 89 | SUPERIOR | 70 | 82 | 0.85 | SUPERIOR | EXAMPLE |
| 71 | 1 | 1.6 | 711 | 38 | 39 | INFERIOR | 28 | 35 | 0.80 | INFERIOR | COMPARATIVE EXAMPLE |
| 72 | 2 | 1.6 | 912 | 51 | 28 | INFERIOR | 21 | 27 | 0.78 | INFERIOR | COMPARATIVE EXAMPLE |
| 73 | 24 | 1.6 | 808 | 44 | 32 | INFERIOR | 25 | 31 | 0.81 | INFERIOR | COMPARATIVE EXAMPLE |

UNDERLINE INDICATES OUT OF RANGE OF PRESENT INVENTION, OR OUT OF DESIRED RANGE.

As listed in Table 6, when the area ratio of martensite was 90% or more, the fine local deformability and toughness could be obtained, but the enough local deformability and toughness could not be obtained in the comparative examples, in which the area ratio of martensite was less than 90%.

INDUSTRIAL APPLICABILITY

The present invention may be used for, for example, manufacturing industries and using industries of a steel sheet for hot stamping used for vehicle body components such as a door beam and a center pillar and others. The present invention may be used also for manufacturing industries and using industries of other machine structural components and others.

The invention claimed is:
1. A cold-rolled steel sheet for hot stamping, comprising a chemical composition expressed by, in mass%:
C: 0.08% or more and less than 0.20%;
Si: 0.003% to 0.2%;
Mn: 1.6% to 3.5%;
sol. Al: 0.0002% to 2.0%;
B: 0.0003% to 0.01%;
P: 0.1% or less;
S: 0.004% or less;
N: 0.01% or less;
Ti: 0% to 0.04 +48/14 × [N] % when an N content is expressed by [N];
Cr: 0% to 1.00%;
Bi: 0% to 0.5%;
Ca: 0% to 0.05%;
Mg: 0% to 0.05%;
REM: 0% to 0.05%;
Mo: 0% to 1%;
Cu: 0% to 1%;
Ni: 0% to 1%;
W: 0% to 1%;
Nb: 0% to 1%;
V: 0% to 1%;
balance: Fe and impurities,
wherein:
an expression (1) is satisfied when an Mn content is represented by [Mn] and a C content is represented by [C],

$$\text{where } [Mn]+6.67\times[C]-2.73\geq 0 \quad (1); \text{ and}$$

the cold rolled steel sheet comprises a steel structure consisting of, in an area ratio:
bainite: 20% to 95%;
ferrite: 5% to 80%; and
balance: one or two selected from the group consisting of pearlite and martensite.

2. The cold-rolled steel sheet for hot stamping according to claim 1, wherein the chemical content contains:

Ti: 48/14 ×[N]% to 0.04 +48/14×[N]%.

3. The cold-rolled steel sheet for hot stamping according to claim 1, wherein
a Cr content is 0.01% to 1.00%, and
when the Mn content is represented by [Mn] and the Cr content is represented by [Cr], an expression (2) is satisfied, $$1.6\leq[Mn]+[Cr]\leq 3.5 \quad (2).$$

4. The cold-rolled steel sheet for hot stamping according to claim 1, wherein the chemical content contains:
Bi: 0.0001% to 0.5%.

5. The cold-rolled steel sheet for hot stamping according to claim 1, wherein the chemical composition contains one or more selected from the group consisting of:
Ca: 0.0005% to 0.05%;
Mg: 0.0005% to 0.05%; and
REM: 0.0005% to 0.05%.

6. The cold-rolled steel sheet for hot stamping according to claim 1, wherein the chemical composition contains one or more selected from the group consisting of:
Mo: 0.03% to 1%;
Cu: 0.01% to 1%;
Ni: 0.01% to 1%; and
W: 0.01% to 1%.

7. The cold-rolled steel sheet for hot stamping according to claim 1, wherein the chemical composition contains one or two selected from the group consisting of:
Nb: 0.005% to 1%; and
V: 0.005% to 1%.

8. A method of manufacturing the cold-rolled steel sheet for hot stamping according to claim 1, comprising:
hot-rolling a steel ingot or a steel billet;
acid-pickling a steel sheet obtained by the hot-rolling;
cold-rolling a steel sheet obtained by the acid pickling; and
performing a heat treatment of a steel sheet obtained by the cold-rolling,
wherein:
the steel ingot or the steel billet comprises the chemical composition according to claim 1;
the hot-rolling comprises:
starting a rolling at a temperature of 1050° C. or more; and
thereafter coiling at a temperature zone of 400° C. to 700° C.; and the performing the heat treatment comprises:
heating to a temperature zone of 700° C. to 840° C.;
thereafter cooling to a temperature of 500° C. or less at an average cooling rate of 5° C/sec to 100° C/sec; and
thereafter retaining at a temperature zone of 300° C. to 500° C. for 5 seconds to 600 seconds.

9. A method of manufacturing the cold-rolled steel sheet for hot stamping according to claim 1, comprising:
hot-rolling a steel ingot or a steel billet;
acid-pickling a steel sheet obtained by the hot-rolling;
cold-rolling a steel sheet obtained by the acid pickling;
performing a heat treatment of a steel sheet obtained by the cold-rolling, and plating a steel sheet obtained by the heat treatment,
wherein:
the steel ingot or the steel billet comprises the chemical composition according to claim 1;
the hot-rolling comprises:
starting a rolling at a temperature of 1050° C. or more; and
thereafter coiling at a temperature zone of 400° C. to 700° C.;
the performing the heat treatment comprises:
heating to a temperature zone of 700° C. to 840° C.;
thereafter cooling to a temperature of 580° C. or less at an average cooling rate of 3° C/sec to 20° C/sec; and
thereafter retaining at a temperature zone of 500° C. to 570° C. for 5 seconds to 600 seconds; and
the plating comprises:
performing a hot-dip galvanizing treatment; and
thereafter performing an alloying treatment at a temperature zone of 500° C. to 650° C.

10. The method of manufacturing the cold-rolled steel sheet for hot stamping according to claim 8,
wherein the chemical composition contains:

Ti:48/14×[N]% to 0.04 +48/14×[N]%.

11. The method of manufacturing the cold-rolled steel sheet for hot stamping according to claim 8,
wherein a Cr content is 0.01% to 1.00%, and when the Mn content is represented by [Mn] and the Cr content is represented by [Cr], an expression (2) is satisfied, $$1.6 \leq [Mn]+[Cr] \leq 3.5 \qquad (2).$$

12. The method of manufacturing the cold-rolled steel sheet for hot stamping according to claim 8,
wherein the chemical composition contains:
Bi: 0.0001% to 0.5%.

13. The method of manufacturing the cold-rolled steel sheet for hot stamping according to claim 8,
wherein the chemical composition contains one kind or two or more kinds selected from the group consisting of:
Ca: 0.0005% to 0.05%;
Mg: 0.0005% to 0.05%; and
REM: 0.0005% to 0.05%.

14. The method of manufacturing the cold-rolled steel sheet for hot stamping according to claim 8,
wherein the chemical composition contains one kind or two or more kinds selected from the group consisting of:
Mo: 0.03% to 1%;
Cu: 0.01% to 1%;
Ni: 0.01% to 1%; and
W: 0.01% to 1%.

15. The method of manufacturing the cold-rolled steel sheet for hot stamping according to claim 8,
wherein the chemical composition contains one kind or two kinds selected from the group consisting of:
Nb: 0.005% to 1%; and
V: 0.005% to 1%.

16. The method of manufacturing the cold-rolled steel sheet for hot stamping according to claim 9,
wherein the chemical composition contains:

Ti:48/14×[N] % to 0.04+48/14×[N]%.

17. The method of manufacturing the cold-rolled steel sheet for hot stamping according to claim 9,
wherein a Cr content is 0.01% to 1.00%, and when the Mn content is represented by [Mn] and the Cr content is represented by [Cr], an expression (2) is satisfied, $$1.6 \leq [Mn]+[Cr] \leq 3.5 \qquad (2).$$

18. The method of manufacturing the cold-rolled steel sheet for hot stamping according to claim 9,
wherein the chemical composition contains:
Bi: 0.0001% to 0.5%.

19. The method of manufacturing the cold-rolled steel sheet for hot stamping according to claim 9,
wherein the chemical composition contains one kind or two or more kinds selected from the group consisting of:
Ca: 0.0005% to 0.05%;
Mg: 0.0005% to 0.05%; and
REM: 0.0005% to 0.05%.

20. The method of manufacturing the cold-rolled steel sheet for hot stamping according to claim 9, wherein the chemical composition contains one kind or two or more kinds selected from the group consisting of:
Mo: 0.03% to 1%;
Cu: 0.01% to 1%;
Ni: 0.01% to 1%; and
W: 0.01% to 1%.

21. The method of manufacturing the cold-rolled steel sheet for hot stamping according to claim 9,
wherein the chemical composition contains one kind or two kinds selected from the group consisting of:
Nb: 0.005% to 1%; and
V: 0.005% to 1%.

* * * * *